United States Patent [19]

Shacklette

[11] Patent Number: 5,378,403
[45] Date of Patent: Jan. 3, 1995

[54] HIGH ELECTRICALLY CONDUCTIVE POLYANALINE COMPLEXES HAVING POLAR SUBSTITUTENTS

[75] Inventor: Lawrence W. Shacklette, Maplewood, N.J.

[73] Assignee: AlliedSignal Inc., Morristownship, Morris County, N.J.

[21] Appl. No.: 952,371

[22] Filed: Sep. 28, 1992

Related U.S. Application Data

[63] Continuation-in-part of Ser. No. 317,367, Mar. 1, 1989, Pat. No. 5,160,457, which is a continuation-in-part of Ser. No. 82,886, Aug. 7, 1987, Pat. No. 5,069,820.

[51] Int. Cl.6 .......................... H01B 1/00; H01B 1/06
[52] U.S. Cl. .................... 252/500; 252/518; 252/519
[58] Field of Search ................ 252/500, 518, 519; 524/157, 158; 528/422

[56] References Cited

U.S. PATENT DOCUMENTS

| | | | |
|---|---|---|---|
| 3,963,498 | 6/1976 | Trevoy | 252/500 |
| 4,798,685 | 1/1989 | Yaniger | 252/500 |
| 4,806,271 | 2/1989 | Yaniger et al. | 528/422 |
| 4,851,487 | 7/1989 | Yaniger et al. | 252/500 |
| 4,855,361 | 8/1989 | Yaniger et al. | 252/500 |
| 4,935,163 | 6/1990 | Cameron et al. | 252/500 |
| 4,940,640 | 7/1990 | MacDiarmid | 429/213 |
| 5,034,463 | 7/1991 | Brokken-Zijp et al. | 252/518 |
| 5,066,278 | 11/1991 | Hirschberg et al. | 252/500 |
| 5,069,820 | 12/1991 | Jen et al. | 252/518 |
| 5,160,457 | 11/1992 | Elsenbaumer | 252/500 |

FOREIGN PATENT DOCUMENTS

| | | |
|---|---|---|
| 0017717 | 10/1980 | European Pat. Off. . |
| 0055358 | 10/1981 | European Pat. Off. . |
| 0361429 | 4/1990 | European Pat. Off. . |
| WO89/01694 | 2/1989 | WIPO . |
| WO90/01775 | 2/1990 | WIPO . |
| WO90/10297 | 9/1990 | WIPO . |
| WO91/06887 | 5/1991 | WIPO . |

OTHER PUBLICATIONS

MacDiarmid, A. G., et al., "The Polyaniline: A Novel Class of Conducting Polymers", *Mat. Res. Soc. Sump. Proc.*, vol. 173, pp. 283–291, 1990 (No Month).

Angelopoulos, M. et al., "Polyaniline: Solutions, Films and Oxidation State", *Mol. Cryst. Liq. Cryst.*, vol. 160, pp. 151–153, 1988 (No Month).

Cao., Y. et al., "Influence of Chemical Polymerization Conditions on the Properties of Polyaniline", *Institute of Polymers and Organic Solids, Uni. of Cal.* vol. 30, pp. 2305–2311, 1989 (No Month).

*Primary Examiner*—Anthony Green
*Attorney, Agent, or Firm*—Karen A. Harding; Jay P. Friedenson

[57] ABSTRACT

This invention relates to thermally stable electrically conductive conjugated polymer comprising a conjugated polymer cation such as a substituted or unsubstituted polyaniline doped with a dopant anion substituted with one or more polar groups such as hydroxy, the polar group having an electronegativity or an electropositivity such that said polar group or groups have a net polar group molar contribution greater than zero.

41 Claims, No Drawings

HIGH ELECTRICALLY CONDUCTIVE POLYANALINE COMPLEXES HAVING POLAR SUBSTITUTENTS

RELATED APPLICATION

This application is a continuation-in-part application of U.S. patent application Ser. No. 317,367, filed Mar. 1, 1989 now U.S. Pat. No. 5,160,457, which, in turn, is a continuation-in-part application of U.S. patent application Ser. No. 082,886, filed Aug. 7, 1987 U.S. Pat. No. 5,069,820.

BACKGROUND OF THE INVENTION

1. Field of the Invention

This invention relates to thermally stable electrically conductive substituted and unsubstituted polyaniline compositions having relatively high electricaly conductivity and preferably having relatively high thermal stability. Another aspect of this invention relates to compositions comprising such polyanilines and other materials as for example fillers, polymers, and the like. Yet another aspect of this invention relates to polyaniline articles, including films, fibers, coatings and the like formed from the polymer compositions of this invention.

2. Description of the Prior Art

There has recently been an increased interest in the electrochemistry and electrical phenomena of polymeric systems. Recently, work has intensified with polymers having extended conjugation in at least one backbone chain. One conjugated polymer system with strong hydrogen bonding and polar interactions currently under study is polyaniline. See for example European Patent No. 0017717 and U.S. Pat. Nos. 3,963,498, 4,025,463, 4,855,361, 4,798,685, 4,806,271, 4,851,487, 4,940,640, 4,798,685, 5,006,278 and 5,069,820; and PCT W089/01694 and PCT W090/102797. Another conjugated polymer system which is capable of strong hydrogen bonding and/or polar interactions is polypyrrole. See for example EP0055358.

There has recently been an increased interest in the electrochemistry and electrical phenomena of polymeric systems such as polyaniline. See for example.

SUMMARY OF THE INVENTION

One aspect of the present invention relates to a electrically conductive doped substituted or unsubstituted polyaniline comprised of a positively ionized polyaniline (polymeric cation) and one or more organic dopant solute species (anions) selected from the group consisting an organic moiety having one or more anionic functional groups as for example such groups containing one or more phosphorous or sulfur containing anionic functional group such as a phosphorus or sulfur acid functional group, and having at least one substituent selected from the group consisting of "polar groups" having an electronegativity or electropositivity such that said groups have a net polar group molar contribution greater than zero. This invention also relates to a composition comprising a matrix of one or more non-electrically conductive thermoplastic and/or thermosetting polymers having one or more doped polyanilines of this invention dispersed therein, and to articles formed from this composition. This invention also relates to a process for forming the compositions of this invention by melt-blending one or more doped polyanilines of this invention and one or more polymers selected from the group consisting of thermoplastic polymers and thermosetting polymers. Yet another aspect of this invention relates to articles formed from the composition and polyaniline of this invention.

As used herein "conjugated polymer(s)" are homopolymers or copolymers which are comprised of alternating carbon-carbon double bonds (either singly or as part of an aromatic ring structure), and optionally including one or more heteroatoms such as oxygen, nitrogen, sulfur, selenium, phosphorous and the like along the polymer conjugated backbone or conjugated side chains thereof which can be rendered to an electrically conductive state (an electroconductivity equal to or greater than about $10^{-8}$S/cm as determined by the four-in-line probe method described in "Laboratory Notes on Electrical and Galvanometric Measurements" by H. H. Wieder, Elsevier Scientific Publishing Co., New York, New York, 1979) by doping with some dopants known in the art). As used herein, an "organic radical" means a polymeric, monomeric or oligomeric organic radical; "electrically conductive" means that the doped conjugated polymer has a conductivity of at least about $10^{-8}$S/cm (preferably equal to or greater than about $10^{-6}$S/cm, more preferably equal to or greater than about $10^{-3}$S/cm and most preferably equal to or greater than about 1 S/cm) as determined by the four-in-line probe method described in "Laboratory Notes on Electrical and Galvanometric Measurements" by H. H. Wieder, Elsevier Scientific Publishing Co., New York, 1979; "thermally stable" means an electrically conductive polymer having a half life for electrical conductivity equal to or greater than one hour in air at a temperature of 150° C.; "acid function" is a acid function having at least one proton or at least one function that can be thermally or chemically transformed into a proton under use conditions, such as $NH_4^+$, $PH_3S^+$, $N(CH_3)_2H_2^+$, $N(C_2H_5)H_3^+$ and the like such as a carboxylic acid, boric acid, sulfonic acid, sulfonic acid, phosphoric acid, phosphinic acid and the like; and "sulfur or phosphorus acid function" means acid groups containing a sulfur and/or phosphorus atom such as sulfonic acid, sulfonic acid, phosphoric acid, phosphinic acid, phosphonic acid and the like.

Several advantages flow from this invention. For example, the electrically conductive conjugated polymers of this invention exhibit enhanced electrical conductivity which is believed to result from the polar substituent. Still other electrically conductive conjugated polymers of this invention exhibit enhanced electrical conductivity and enhanced thermal stability where the polar substituent is also hydrogen bonding.

DESCRIPTION OF THE PREFERRED EMBODIMENTS

Conjugated polymers for use in the process of this invention may vary widely provided that the polymer includes one or more hydrogen bonding groups. The hydrogen bonding group can be at any position in the polymer as for example in a backbone chain, in a chain pendant to the main backbone or substituted to said backbone chain or said pendant chain, but is preferably in the main backbone. Illustrative of such polymers are poly(unsaturated) polymers such as substituted and unsubstituted polyacetylene; substituted or unsubstituted poly(heteroaromatics), such as poly(thienylenes), poly(pyrroles), poly(quinolines), poly(isothianaphthenes), poly(carbazoles), poly(alkyl thiophenes) and the like; substituted or unsubstituted poly(aromatics) such as poly (phenylene sulfides), poly(anilines), polyacenes, poly(phenylenes), poly(naphthalenes), poly(naphthols), and poly(perinaphthalenes); poly(benzoquinones); poly(azulenes); and substituted or unsubstituted poly(aromatic vinylenes) such as poly(phenylene vinylenes), poly(dimethoxyphenylene vinylenes), poly(naphthalene vinylenes) and the like; and substituted or unsubstituted poly(heteroaromatic vinylenes) such as poly(thienylene vinylenes), poly(furylene vinylenes), poly(carbazole vinylenes), poly(pyrrole vinylenes) and the like or derivatives thereof which include one or more hydrogen bonding groups.

Where the polymer does not include a polar group in the backbone chains or in a pendant chain, as for example, polyphenylene, poly(naphthalene), poly(perinephthalene) and the like then only derivatives which are substituted by a hydrogen bonding group such as hydroxyl are suitable. Other polymers such as polypyrroles and polyanilines which include hydrogen bonding group in the polymer backbone need not be derivatized.

Preferred conjugated homopolymers or copolymers are "conjugated backbone homopolymers or copolymers". As used herein, "conjugated backbone homopolymers or copolymers" are conjugated homopolymers or copolymers in which all or substantially all of the conjugation is in the main backbone of the homopolymer or copolymer.

Preferred conjugated homopolymer or copolymers are substituted or unsubstituted polyanilines, poly(heterocycles), and aromatic or heteroaromatic vinylenes. Illustrative of preferred homopolymers or copolymers of poly(heterocycles), and aromatic or heteroamatic vinylenes are those described in more detail in U.S. Pat. Nos. 4,711,742 and 5,068,060 and PCT/W088/00954. More preferred for the practice of this invention are conjugated polymers which have relatively low acidity (pKa>2, preferably>4 and most preferably>6) and which are readily doped by protonic acids as for example, polyaniline, poly(benzoquinone), polypyrrole, and poly(azobenzene).

More preferred conjugated backbone homopolymers or copolymers are poly(anilines) and polypyrroles. Most preferred polymers are polyanilines. As used herein, "poly(anilines)" are homopolymers or copolymers in which the recurring backbone monomeric units are selected from the group consisting of substituted or unsubstituted phenyl rings and amine linkages (—NH— or —NR— where R is a substituent other than hydrogen) which may contain varying amounts of substituted or unsubstituted quinoid rings and imine (—N=) linkages. As used herein, "neutral or undoped polyaniline" is characterized by an uncharged backbone, "polyaniline base" is a particular form of undoped polyaniline which contains at least one quinoid diimine linkage in the backbone and "electrically conductive or doped poly(aniline)" is characterized by a charged backbone which may be formed by a partial or complete protonation of the amine and/or imine nitrogen atoms. As used herein, "leuco-polyaniline" is a neutral form of polyaniline which is in a reduced form (low oxidation state) and which comprises to a substantial degree aromatic phenyl rings linked by amine (—NH—) linkages. Such leuco-polyanilines are preferably doped with oxidizing dopants (such as ferric salts).

Polyanilines for use in the process of this invention may vary widely. Any form of substituted and unsubstituted polyaniline can be conveniently used in the practice of this invention. Illustrative of useful forms are those described in Green, A. G. and Woodhead, A. E., CXVII—Aniline-black and Allied Compounds, Part II", *J. Chem. Soc.,* 101 pp. 1117 (1912) and Kobayashi, et al., "Electrochemical Reactions . . . of Polyaniline Film-Coated Electrodes", *J. Electroanal, Chem,* 177 pp. 281-91 (1984) and in Shacklette, L. W., et al. "Structure and Properties of Polyaniline as Modeled by Single-Crystal Oligomers", *J. Chem Phys.* 88, pp 3955 (1988), which are hereby incorporated by reference. Examples of unsubstituted and substituted polyaniline useful in this invention are characterized by different ratios of phenylene amine and quinone imine backbone segments and include leucoemeraldine, protoemeraldine, emeraldine, nigraniline and pernigraniline. (See U.S. Pat. No. 4,940,640)

In the preferred embodiments of the invention, poly(anilines) for use in the invention are homopolymers and copolymers of the type derived from the polymerization of unsubstituted and substituted anilines of the Formula I:

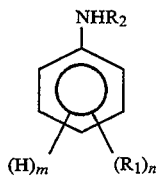

FORMULA I wherein:

n is an integer from 0 to 5;

m is an integer from 0 to 5, with the proviso that the sum of n and m is equal to 5 and with the further proviso that at least one position on the aniline ring, preferably at the para position, is substituted with a substituent which will allow coupling of the aniline units, such as halo, hydrogen or other leaving group;

R₁ is the same or different at each occurrence and is selected from the group consisting of alkyl, deuterium, alkenyl, alkoxy, cycloalkyl, cycloalkenyl, alkanoyl, alkylthio, aryloxy, alkylthioalkyl, alkylaryl, arylalkyl, amino, alkylamino, dialkylamino, arylamino, diarylamino, alkylarylamino, aryl, alkylsulfinyl, aryloxyalkyl, alkylsulfinylalkyl, alkoxyalkyl, alkylsulfonyl, arylthio, alkylsulfonylalkyl, boric acid or salts or esters thereof, phosphoric acid or salts or esters thereof, sulfinate salts, arylsulfinyl, alkoxycarbonyl, arylsulfonyl, carboxylic acid or salts or esters thereof, phosphonic acid or salts or esters thereof, halo, hydroxy, cyano, sulfinic acid or salts or esters thereof, phosphinic acid or salts or esters thereof, sulfonic acid or salts or esters thereof, nitro, alkylsilane, or any of the foregoing aryl, aliphatic or cycloaliphatic groups substituted with one or more phosphonic acid or salts or esters thereof, sulfonic acid or salts or esters thereof, phosphoric acid or salts or esters thereof, boric acid or salts or esters thereof, sulfinic acid or salts or esters thereof, phosphinic acid or salts or esters thereof, carboxylic acid or salts or esters thereof, halo, nitro, amino, alkylamino, dialkylamino, arylamino, diarylamino, alkylarylamino, cyano or epoxy moieties; or any two R₁ groups together or any R₁ group together with any R₂ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, or salts or esters thereof, carbonyl, sulfonyl, or oxygen atoms wherein permissible substituents are one or more phosphonic acid or salts or esters thereof, sulfonic acid or salts or esters thereof, phosphoric acid or salts or esters thereof, boric acid or salts or esters thereof, phosphinic acid or salts or esters thereof, carboxylic acid or salts or esters thereof, halo, nitro, amino, alkylamino, sulfinic acid or salts or esters thereof, dialkylamino, arylamino, diarylamino, alkylarylamino, cyano or epoxy moieties; or $R_1$ is an aliphatic moiety having repeat units of the formula:

—(OCH$_2$CH$_2$)$_q$O—CH$_3$,
—(OCH$_2$CH(CH$_3$))$_q$O—CH$_3$, —(CH$_2$)$_q$CF$_3$,
—(CF$_2$)$_q$—CF$_3$ or —(CH$_2$)$_q$CH$_3$ wherein q is a positive whole number; and Illustrative of useful $R_1$ groups are hydrogen, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; amino; alkylamino, such as methylamino, ethylamino, butylamino and the like; dialkylamino, such as dimethylamino, methylethylamino and the like; arylamino such as phenylamino, p-methylphenylamino and the like; diarylamino, such as diphenylamino, p-nitrophenyl-p'-methylphenylamino and the like; alkylarylamino, such as 2-phenyl-4-methylamino and the like; alkylsulfinyl, alkylsulfonyl, alkylthio, arylthio, arylsulfinyl, and arylsulfonyl such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclo-octyl, cycloheptyl and the like; alkoxyalkyl such as methoxy-methyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxypropyl, 1-hydroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; acid and acid salts such as sulfonic acid, carboxylic acid and salts thereof; aliphatic or aryl groups substituted with an acid or salt thereof such as phosphonic acid, phosphinic acid, sulfonate salt, sulfinate salt, sulfonic acid, sulfinic acid, borate salt, phosphoric acid, boric acid, or carboxylic acid groups such as ethylsulfonic acid, propylsulfonic acid, 4-nitrobenzene sulfonic acid, butylsulfonic acid, phenylsulfonic acid, and the like.

Also illustrative of useful $R_1$ groups are divalent moieties derived from any two $R_1$ groups or a $R_1$ group with a $R_2$ group such as moieties having from about 2 to about 7 repeat units of the formula:

—(CR$_3$=CR$_3$)$_b$—

—(C(R$_3$)$_2$)$_a$— wherein $R_3$ is the same or different at each occurrence and is hydrogen or alkyl, as for example —(CH$_2$)$_4$—, —(CH$_2$)$_3$—, —(CH=CH—CH=CH)—, —[CH$_2$—CH(CH$_3$)—CH$_2$]— and —(CH$_2$)$_5$—, and groups comprised of such moieties which include one or more heteroatoms of oxygen, nitrogen, ester, sulfonyl, carbonyl, sulfinyl, and/or sulfur, such as —CH$_2$SCH$_2$— —CH$_2$NHCH$_2$—, —SCH$_2$NHCH$_2$—, —O—CH$_2$—CH$_2$O— —O—CH$_2$—S—CH$_2$—, —CH$_2$S(O$_2$)CH$_2$—, —CH$_2$S(O)CH$_2$—, —OC(O)CH$_2$CH$_2$—, —CH$_2$C(O)CH$_2$— and —CH$_2$—O—CH$_2$— to form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydro-benzothiazineamine, benzothiopyranamine, dihydro-benzoxazoleamine and the like. Exemplary of useful $R_3$ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepine-amine, benzimidazolylamine, benzisoxazoleamine, benzoxazolylamine, benzothiazineamine, benzoxazineamine, naphthaleneamine, benzopyranamine, benzothiazineamine, anthraceneamine, aminobenzothio-pyran, aminobenzodiazine, benzthiopyrone amine, amino-coumarin, benzthiopheneamine, benzothiodiazoleamine, and the like.

Exemplary of useful $R_2$ groups are hydrogen and the above-referenced representative $R_1$ groups described above such as alkyl as for example, methyl, ethyl, isopropyl, butyl, isobutyl, hexyl, octyl and the like; alkylsulfonyl such as methylsulfonyl, ethylsufonyl, propylsulfonyl and the like; arylsulfonyl such as phenylsulfonyl, p-methyl phenylsulfonyl, naphthylsulfonyl and the like.

$R_2$ is selected from the group consisting of permissible $R_1$ substituents and hydrogen.

Preferred polyaniline consists of repeat units of the Formulas II and/or III:

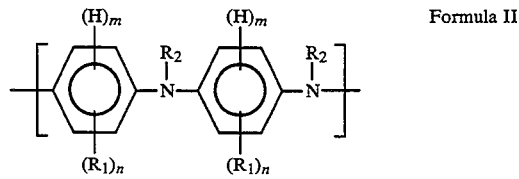

Formula II

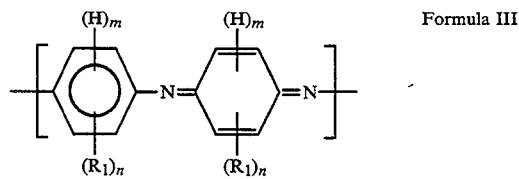

Formula III a combination thereof having various ratios of the above repeat units in the polyaniline backbone such as leucoemeraldine, protoemeraldine, emeraldine, nigraniline and pernigraniline. Poly(anilines) useful in the practice of this invention are more preferably those of the Formula IV:

FORMULA V $$\left[\left[\left(\underset{(R_1)_n}{\bigcirc}\overset{(H)_m}{\underset{H}{\overset{|}{N}}}\right)_x\left(\left(\underset{(R_1)_n}{\bigcirc}\overset{(H)_m}{\underset{}{}}\right)-N=\left\langle\underset{(R_1)_n}{\bigcirc}\overset{(H)_m}{\underset{}{}}\right\rangle=N\right)_y\right]_z\right]$$

wherein:

n, m, $R_1$ and $R_2$ are as described above;

x and y are the same or different at each occurrence and are integers equal to or greater than 0, with the proviso than the sum of x and y is greater than 0, preferably where x is an integer equal to or greater than 0 and/or that the ratio of x to y is greater than or equal to about 0, more preferably said ratio is equal to or greater than 0.5 and most preferably said ratio is equal to or greater than about 1; and z is the same or different at each occurrence and is an integer equal to or greater than about 5.

Preferred for use in the practice of this invention are poly(anilines) of the above Formula IV in which:

n is an integer from 0 or 1;

m is an integer from 3 or 4, with the proviso that the sum of n and m is equal to 4;

$R_1$ is phenyl, or alkyl or alkoxy having from 1 to about 12 carbon atoms, a protonic acid function or a salt or ester thereof, or alkyl, phenyl or alkoxy substituted with one more or protonic acids or salts or esters thereof;

x is an integer equal to or greater than 1;

y is equal to or greater than 0, with the proviso that the ratio of x to y is equal to or greater than 0.5;

z is an integer equal to or greater than about 5;

Particularly preferred for use in the practice of this invention are poly(anilines) of the above Formula IV in which:

n is an integer from 0 or 1;

m is an integer from 3 or 4 with the proviso that the sum of n and m is equal to 4;

$R_1$ is alkyl, or alkoxy having from 1 to about 6 carbon carboxylic acid or salts or esters thereof, phosphinic acid or salts or esters thereof, sulfonic acid or salts or esters thereof, sulfinic acid or salts or esters thereof, phosphonic acid or salts or esters thereof, or alkyl or alkoxy substituted with phosphinic acid or salts or esters thereof, sulfinic acid or salts or esters thereof, halo, phosphonic acid or salts or esters thereof, phosphoric acid or salts or esters thereof, or sulfonic acid or salts or esters thereof;

x is an integer equal to or greater than 2;

y is equal to or greater than 0, with the proviso that the ratio of x to y is greater than about 1; and z is an integer equal to or greater than about 10.

Amongst the preferred embodiments, more preferred for use in the practice of this invention are poly(anilines) of the above Formula IV in which:

n is an integer from 0 or 1;

m is an integer from 3 or 4, with the proviso that the sum of n and m is equal to 4;

$R_1$ is alkoxy or alkyl of from 1 to about 3 carbon atoms, sulfonic acid or salts thereof, phosphoric acid or salts thereof, or phosphonic acid or salts thereof;

x is an integer equal to or greater than 2; and y is an integer equal to or greater than 1, with the proviso that the ratio of x to y is equal to or greater than about 2; and z is an integer equal to or greater than about 10.

In the most preferred embodiment of the invention n is 0;

m is 4;

x is an integer equal to about 2;

y is an integer equal to about 1 with the proviso that the ratio of x to y is equal to or greater than about 2;

z is an integer equal to or greater than about 10; $R_1$ is one sulfonic acid or a salt or ester thereof, alkyl or alkoxy having from 1 to about 3 carbon atoms. Poly(aniline) derived from unsubstituted aniline is the poly(aniline) of choice.

In general, the number of conjugated homopolymer or copolymer repeat units are not critical and may vary widely. The greater the number of repeat units the greater the molecular weight of the conjugated homopolymer or copolymer and the greater the viscosity of solutions of the polymer. In the present application where conjugated homopolymers or copolymers of relatively high molecular weight and insolubility are required, then such materials can be used. The number of repeat units is preferably at least about 10. The upper limit can vary widely depending on the desired molecular weight and viscosity and the required degree of processibility, such as melt processibility, solution processibility and the like. In the preferred embodiments of the invention, the number of repeat units is at least about 20, and in the particularly preferred embodiments, the number of repeat units is at least about 30. Amongst the particularly preferred embodiments, most preferred are those embodiments in which the number of repeat units is at least about 40.

In the most preferred embodiments the molecular weight will be sufficiently high to render the conjugated polymer insoluble in the solvent or solvent mixture of the particular paint formulation such that the conjugated polymer will form a dispersion of small particles in the solvent or solvent mixture.

Conjugated homopolymers and copolymers can be conveniently prepared through conventional procedures. Such procedures are well known in the art and will not be described herein in great detail. See for example U.S. Pat. Nos. 4,940,640; 4,711,742; 4,521,589; 4,808,681; 4,983,322; 5,006,278 and 4,900,782; PCT WO88/00954; and "The Handbook of Conducting Polymers", edited by Terje A. Skotheim, Marcell Decker, Inc., New York and Basel and references cited therein, all of which is hereby incorporated by reference. For example, preferred polyanilines can be prepared through use of chemical and electrochemical synthetic procedures. For example, one form of polyaniline can be prepared chemically by treating a suitable aniline with an oxidant such as ammonium persulfate $(NH_4)_2S_2O_8$ in excess acid such as 1M HCl. This powdered form of polyaniline is blue green in color. After methanol washing and air drying this material exhibits a conductivity of about 5 S/cm. This conductive form of polyaniline can be treated with ammonium hydroxide in ethanol to form a non-conductive form of polyaniline which is dark blue in color and which has a conductivity of less than $10^{-8}$ S/cm. Other chemical procedures for preparation of various chemical forms of polyaniline are described in detail in Green et al and U.S. Pat. Nos. 4,855,361, 4,798,685, 4,806,271, 4,822,638, 4,851,487 and 4,940,517 described above.

Useful forms of conjugated polymers can also be prepared electrochemically. For example, useful forms of polyaniline can be prepared by the electrochemical oxidation of aniline in aqueous fluoroboric acid electrolyte on a platinum foil anode.

Other useful conjugated polymers can be prepared pyrolytically. For example, polyacenes can be prepared by the pyrrolysis of phenolic resins as described in greater detail in U.S. Pat. Nos. 4,615,960; 4,628,015; 4,601,849; and 4,753,717.

Other chemical and electrochemical syntheses and transformations of the conductive form of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations of the appended claims.

The conjugated polymer may be electrically neutral or electrically conductive. The conjugated polymer is rendered electrically conductive by doping with a dopant solute. In general, such dopant solute is derived from a dopant compound, which upon addition to the conjugated polymer, introduces positive charge carriers onto the polymer backbone with co-committent formation of an anionic dopant solute species (dopant anion) to form a charge transfer complex with the conjugated polymer, which complex has a conductivity equal to or greater than about $10^{-8} \text{ohm}^{-1} \text{cm}^{-1}$ by the four-in-line probe method.

Dopants for use in the practice of this invention are critical. The particular dopant of choice will depend on the particular form of the undoped conjugated polymer. For example, if the polymer is initially in a reduced state (e.g. reduced polypyrrole or leucopolyaniline) then the dopant of choice preferably would be an oxidizing dopant or combination of dopants. Alternatively, if the polymers were a base, as for example, polyaniline base, then the preferred dopant would be an acid. The dopant is an organic compound having at least one sulfur or phosphorus acid function and at least one polar substituent having a net dipole moment greater than zero such that upon the formation of a complex with the conjugated polymer an anion having a polar substituent is generated. While we do not wish to be bound by any theory, it is believed that the net dipole moment generated by the polar substitutent smooths the dipolar field generated by the array of charge on the backbone of the doped conjugated polymer such as polyaniline, polypyrrole, polythiophene, poly(phenylene vinylenes) and derivatives thereof and the like and that the smoothing of the dipolar field leads to an increase in charge delocalization and hence to an increase conductivity. In the preferred embodiments of the invention, the substituent is polar and hydrogen bonding, which leads to enhance thermal stability in addition to high electrical conductivity. While we do not wish to be bound by any theory, it is believed that in addition to increased charge delocalization resulting from the polarity of the substituent, the dipole-dipole interactions with the polymer or, where the polar substituent is also hydrogen bonding, the hydrogen bonding interactions between the dopant and the conjugated polymer strengthen bonding between the dopant and the polymer cation over and above that provided by the primary ionic interaction. Such increased bond strength leads to increased thermal stability. Likewise, dopants containing multiple polar and hydrogen bonding substituents, such as sulfonic acid groups, phosphonic acid groups, boronic acid groups, carboxylic acid groups, phosphoric acid groups, phosphinic acid groups, carboxylic acid groups, sulfinic acid groups and the like, halo groups, cyano groups, nitro groups, hydroxyl groups, carbonyl groups and the like are preferred over dopant anions which contain only a single polar and hydrogen boding substituent, since in this case the strength of ionic bonding is increased. Moreover, with additional bonding provided by multiple hydrogen bonding and polar groups, bonding to and between multiple polyaniline chains can also take place. Such bonding is believed to lead to a more rigid three-dimensionally bonded structure which will act to limit the loss of dopant at high temperature and provide enhanced thermal stability.

Useful polar groups, and preferred polar and hydrogen bonding substituents may vary widely. Polar, and polar and hydrogen bonding substituents which provide the desired net dipole moment constant are well known to those of skill in the art. Illustrative of useful groups are those described in A. F. M. Barton, "Handbook of Solubility Parameters", CRC Press, Boca Raton, Fla., pg. 70 and pg. 85–86 and Pimentel and McClellan, "The Hydrogen Bond", W. H. Freeman Company, San Francisco (1960). Useful polar substituents are those having a polarity greater than that of a carbon/hydrogen substituent such as a methyl group. Such groups will often exhibit inductive effects, and/or resonance effects and will often include one or more heteratoms or a halogen. Illustrative of such groups are halo, cyano, hydroxy, carboxyl, alkylamino, amino, imino, urethane, nitro, mercapto, phenyl and carbonyl containing groups such as an aldhehyde as for example formyl, acetyl, and the like, esters as for example methylacetate and the like, amide as for example amido and the like, alkoxy and alkylthio such as methoxy, ethoxy, methylthio, ethylthio and the like, quaternary ammonium, haloalkyl as for example trifluoromethyl, and inorganic acids and their esters. Preferred for use in the practice of this invention are groups which are polar and hydrogen bonding. Illustrative of such preferred polar and hydrogen bonding groups are hydroxy, carboxyl and carbonyl containing groups, and the more preferred polar and hydrogen bonding group is hydroxy.

A measure of the polar contribution of a particular substituent can be estimated by the polar group molar attraction constant, $F_p$, measured in units of $J^{\frac{1}{2}} \text{ cm}^2 \text{ mol}^{-1}$. Such values are listed in the A. F. M. Barton Handbook, p. 70 and p. 85. It is a requirement for this invention that the Fp be greater than zero. Preferred values of Fp are greater than 200, more preferred values of $F_p$ are greater than 400 and most preferred values of $F_p$ are greater than 500.

In the dopant for the preferred embodiments of the invention, one or more sulfur or phosphorous acid functions and the one or more polar bonding substituents are bonded to an organic substrate such as an aliphatic substrate as for example alkoxyalkyl, alkyl or like substrates, or aromatic substrate such as phenyl, biphenyl oxide, biphenyl sulfide, biphenyl methane, triphenyl methane, biphenyl, anthracyl, naphthyl, phenanthryl, pryridyl, quinoline and the like or a polymeric or oligomeric substrate such as a polymer having recurring pendant aromatic groups in the polymeric backbone or a polymeric group in the backbone substituted with a polar substituent and a sulfur or phosphorus acid function such as phenolic, polyphenylene, polyacene, poly(perinaphthalene), polystyrene, poly (2-methylstyrene), poly(aniline), poly(naphthalene), poly(4-phenylstyrene), poly(2-vinyl naphthalene), poly(vinyl benzoate), poly(benzyl methacrylate) and the like substituted with a suitable acid and polar substituent. Preferred substrates are rigid. For example, aromatic and fused ring systems are preferred over aliphatic systems. In the particularly preferred embodiments of the invention, the substrate is aromatic and in the most preferred embodiments of the invention the substrate is phenyl or naphthyl, with phenyl being the substrate of choice.

Dopants for use in this invention may vary widely include oxidizing dopants and protonic acid dopants, with the proviso that the dopant includes at least one polar substituent. Illustrative of useful oxidizing dopants are $NO_2^+$ and Fe(III) salts such as those of the formulas $NO_2R_7SO_3$, $NO_2R_7CO_2$, $NO_2R_7SO_2$, $Fe(R_7SO_3)_3$, $Fe(R_7CO_2)_3$, and $Fe(R_7SO_2)_3$, which give rise to doped polymers containing dopant anions of the formulas: $R_7SO_3^-$, $R_7CO_2^-$ and $R_7SO_2^-$, wherein $R_7$ is an organic radical having the required polar substituent.

In the preferred embodiments of the invention, the dopant is an organic protonic acid. The acid functionality of the dopant may vary widely. The only requirement is that the acid is capable of partially or completely protonating the conjugated polymer to form a charge-transfer complex comprising the dopant anion and the polymer cation. For example, in the case of polyaniline, the acid should be capable of protonating the nitrogen of the amine linkage, imine linkage or a combination thereof. This can usually be accomplished when the pKa of the acid function is less than that of the conjugated polymer in the doping medium. In the case of polyaniline, acids having a pKa of less than about 5 are preferably used. Such acid functionalities include but are not limited to sulfur or phosphorus acid functionalities such as sulfonic acid functionalities, sulfuric acid functionalities, phosphorous acid functionalities, phosphoric acid functionalities, phosphonic acid functionalities, phosphinic acid functionalities, and the like. Preferred acid functionalities are sulfur acid functionalities, more preferred acid functionalities are sulfonic and most preferred acid functionalities. Whether the dopant(s) is (are) an acid, a salt or an oxidant, the resulting anionic functionality in the conductive polymer complex should preferably be a sulfonate functionality, a sulfinate functionality, a phosphonate functionality or a phosphinate functionality, more preferably they should be a sulfonate or sulfinate functionality and most preferably they should be a sulfonate functionality.

Preferred for use in the practice of this invention are organic acid dopants having anionic moieties of the formulas:

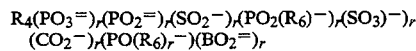
$R_4(PO_3^=)_r(PO_2^=)_r(SO_2^-)_r(PO_2(R_6)^-)_r(SO_3)^-)_r$
$(CO_2^-)_r(PO(R_6)_r^-)(BO_2^=)_r$ and having a cationic moiety or moieties of the Formula:

$M^{+s}$ wherein at least one of the cationic moieties of the formula $M^{+s}$ is a proton or is a moiety which can be transformed into a proton under use conditions;

$M^{+s}$ is a cationic species having a positive charge s;

s is an integer equal to or greater than 1, preferably from 1 to about 8;

$R_4$ is an organic radical, with the proviso that $R_4$ includes one or more polar groups;

r is an integer equal to or greater than 1, preferably from 1 to about 8; and $R_6$ is hydrogen, alkyl, aryl, alkylaryl, aryloxy, arylalkoxy, alkylsulfinyl, alkylthio, alkylsulfonyl or alkoxy.

In these preferred embodiments of the invention, it is preferred that at least one acid functionality and at least one polar group not be adjacent to each other. More preferred are those dopants in which r is greater than 1. Although not critical, it is most preferred that the distance between at least one acid functionality and at least one polar group is such that they are far enough apart so that the acid functionality and the polar group are capable of coordinating along the backbone of a single conjugated polymer chain. For example, in the case of polyaniline the dopant is capable of coordinating with adjacent amine and/or imine linkages along the backbone of a single chain of polyaniline. In the case of unsubstituted polyaniline, this distance is from about 5 Å to about 6 Å.

More preferred for use in the practice of this invention as dopants are acids or acid derivatives of the formula:

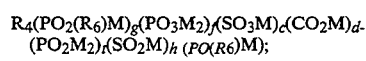
$R_4(PO_2(R_6)M)_g(PO_3M_2)_f(SO_3M)_c(CO_2M)_d$-
$(PO_2M_2)_t(SO_2M)_h (PO(R_6)M)_i$;

or

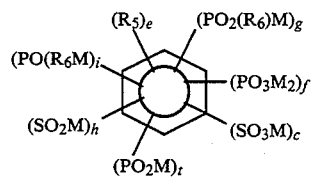

wherein:

M is $H^+$, or other metal or non-metal cation with the proviso that at least one of M is $H^+$ or a moiety which can be thermally or chemically transformed into a proton under use conditions, such as $NH_4^+$, $N(CH_3)_2H_2^+$, $PhS^+$, $N(C_2H_5)H_3^+$ and the like;

t is 0, 1, 2, 3 or 4;

h is 0, 1, 2, 3 or 4;

i is 0, 1, 2, 3 or 4;

c is 0, 1, 2, 3 or 4;

d is 0, 1, 2, 3 or 4;

f is 0, 1, 2, 3 or 4;

g is 0, 1, 2, 3 or 4, with the proviso that at least one of c, d, f, g, h, i or t is other than 0;

e is 0, 1 or 2;

$R_4$ is alkyl substituted with one or more aryl, alkythio, alkoxycarbonyl, alkylcarbonyl, carbonyl, alkylcarbonylalkyl, alkylsulfinylalkyl, alkylsulfonylalkyl, alkylaminoalkyl, aryloxy, hydroxy, alkylamino, dialkylamino, alkylarylamino, halo, amino, (alkyl)arylamino, di(alkyl)arylamino, alkylaryl, alkylthioalkyl, alkoxy, alkoxyalkyl, alkylaryl, alkylsulfinyl, alkylsulfonyl, dialkylaminoalkyl, aryloxyalkyl, aryloxyalkoxy, alkoxyaryl, alkylaryloxy or alkoxyaryloxy with the proviso that $R_4$ includes at least polar group;

$R_5$ is the same or different at each occurrence and is a polar group such as halo, carbonyl, or hydroxy, or an unsubstituted or substituted alkoxycarbonyl, alkylcarbonyl, alkylcarbonylalkyl, alkylsulfinylalkyl, alkylsulfonylalkyl, alkylaryloxy, alkoxyaryloxy, alkylaminoalkyl, alkylamino, dialkylamino, alkylarylamino, (alkyl)arylamino, di(alkyl)arylamino, alkylthioalkyl, amino, alkylarylamino, alkoxy, alkoxyalkyl, alkylaryl, alkylsulfinyl, alkylthio, alkysulfonyl, dialkylaminoalkyl, aryloxyalkyl, aryloxyalkoxy, alkoxyaryl, alkylaryloxy or alkoxyaryloxy, or substituted alkyl or alkylaryl, wherein permissible substituents include polar groups such as sulfonic acid or a salt or ester therof, phosphonic acid or a salt or ester thereof, phosphinic acid or a salt or ester thereof, phosphoric acid or a salt or ester thereof, carboxylic acid or a salt or ester thereof, boric acid or a salt or ester thereof, perhaloalkyl, phenyl, alkoxy, aryloxy, halo, cyano, amino, haloalkyl, hydroxy, nitro, and the like, or any two or more $R_5$ substituents together- may form an alkylene or alkenylene chain completing a ring system such as a fused or spiro ring system which may include one or more cyclic rings, which chain is substituted with one or more of the aforementioned polar groups, or $R_5$ is a moiety of the formula:

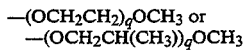

—(OCH$_2$CH$_2$)$_q$OCH$_3$ or
—(OCH$_2$CH(CH$_3$))$_q$OCH$_3$ wherein:

q is a positive whole number from 6 to about 12 or alkyl substituted with said moiety; and $R_6$ is hydrogen, alkyl, aryl, alkylaryl, aryloxy, arylalkoxy, alkylsulfinyl, alkylthio, alkylsulfonyl or alkoxy.

In the particularly preferred embodiments of this invention, useful dopants are acids and/or acid derivatives of the above formula:

$R_4(PO_2(R_6)M)_g(PO_3M_2)_f(SO_3M)_c(PO_2M_2)_t$-$(SO_2M)_h(PO(R_6)M)_i$ or

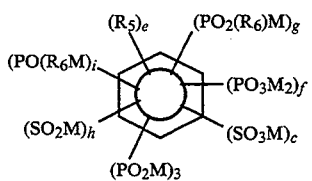

wherein:

c, t, f, g, h and i are the same or different at each occurrence and are 0, 1, 2, or 3, with the proviso that at least one of c, d, t, f or g, i or h is other than 0;

e is 1 or 2;

$R_4$ is substituted alkyl or phenylalkyl wherein permissible substituents are selected from the group consisting of alkoxy, halo, phenyl, hydroxy, carboxy, carboxylic acid, alkoxyphenyl, alkylphenyl, alkylphenoxy, carbonyl, phenoxy, sulfophenoxy, haloalkyl, amino, perhaloalkyl, alkoxyphenyl, alkylphenyl, alkylthio or alkylthioalkyl with the proviso that $R_4$ is substituted with one or more polar substituents;

$R_5$ is the same or different at each occurrence and is a hydrogen bonding group selected from the group consisting of alkoxy, halo, phenyl, hydroxy, amino, alkoxyphenyl, carboxy, carboxylic acid, alkylphenoxy, alkylphenyl, phenoxy, sulfophenoxy, haloalkyl, perhaloalkyl, alkoxyphenyl, alkylphenyl, alkylthio or alkylthioalkyl or any two $R_5$ substituents together may form an substituted alkylene or alkenylene chain completing an aromatic or an alicyclic ring system wherein permissible substituents are one or more of said polar groups $R_5$ is a moiety of the formula:

—(OCH$_2$CH$_2$)$_q$OCH$_3$ or —(OCH$_2$CH)CH$_3$))$_q$OCH$_3$ wherein:

q is a positive whole number from 6 to about 12, with the proviso that $R_5$ is a polar substituent a substituent which is substituted with a polar substituent.

$R_6$ is hydrogen, alkyl, alkoxy or substituted or unsubstituted phenoxy, phenyl or phenylalkyl wherein permissible substitutients are alkyl, alkoxy or a combination thereof; and M is H$^+$, or other metal or non-metal cation, with the proviso that at least one of M is H$^+$ or a moiety which can be thermally or chemically transformed into a proton under use or process conditions.

In the most preferred embodiments of this invention, useful dopants for doping the particles at or near its surface are acids and/or acid derivaties of the formula:

$R_4(PO_2M)_t(SO_3M)_c(PO_3)_f$ or

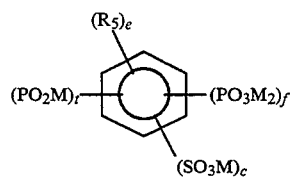

wherein:

c, f and t are the same or different and are 0, 1 or 2, with the proviso that at least one of c, f and t is not 0;

e is 1 or 2;

$R_4$ is alkyl or phenylalkyl substituted with a polar such as one or more carbonyl, halo, carboxyli acid or a salt thereof, phenoxy, hydroxy, sulfophenoxy or alkoxy substituents with the proviso that at least one acid functionality and at least one polar group are not substituted to adjacent carbon atoms;

$R_5$ is the same are different at each occurrence and is a polar group selected from the group consisting of hydroxy, halo, carbonyl, phenoxy, or carboxylic acid or a salt thereof, or is alkyl, phenoxy, phenylalkyl or phenyl group substituted with one or more hydrogen bonding group such as phenoxy, carbonyl, protonic acid group or a salt or ester thereof (e.g. carboxylic acid, phosphinic acid, sulfonic acid, phosphonic acid, sulfonic acid and the like), hydroxy, halo, amino, cyano, sulfophenoxy or alkoxy substituents or any two or more $R_5$ substituents together may form an alkylene or alkenylene chain completing an aliphatic or aromatic ring system which is substituted with one or more of the aforesaid hydrogen bonding groups or one or more protonic acid functions or is substituted with an alkyl, phenylalkyl, phenoxy, alkylphenyl or phenyl group substituted with one or more of the aforesaid hydrogen bonding groups; and M is H$^+$ or other metal or non-metal cation, with the proviso that at least one of M is H$^+$ or is a moiety which can be thermally transformed into a proton under use or process conditions.

In the especially preferred embodiments of this invention, useful dopants for doping the particles at or near its surface are acids or acid derivatives of the formula:

or

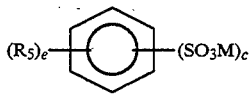

wherein:

c is 1, 2 or 3;
e is 1 or 2;

$R_4$ is alkyl having at least about seven carbon atoms (preferably from about seven carbon atoms to about twenty or thirty carbon atoms) substituted with one or more polar groups such as halo (preferably fluoro), carbonyl, carboxylic acid, carboxy, hydroxy, phenoxy, phenoxy substituted with one or more sulfonic acid or a salt thereof and the like;

$R_5$ is a polar group such as halo (preferably fluoro), a protonic acid or a salt thereof (preferably carboxylic acid or carboxy), carbonyl, hydroxy, alkoxy, alkoxyalkyl, phenoxy, or phenoxy substituted with one or more sulfonic acid or a salt thereof and the like; or any two $R_5$ substituents together may form an alkenylene chain completing a naphthalene ring system which is substituted with one or more of the aforesaid polar groups; and M is $H^+$ or other metal or non-metal cation or a moiety which can be thermally tranformed into a proton under process conditions, with the proviso that at least one —$SO_3M$ group and at least on polar group are substituted at non-adjacent carbon atoms, and with the further proviso that the non-adjacent —$SO_3M$ and polar groups are positioned such that the dipole moment of said dopant is aligned or substantially aligned with the chain direction of the polyaniline backbone of the doped polyaniline and the $SO_3M$ group and the polar group are capable of coordinating with adjacent amine linkages along the backbone of a single polyaniline chain.

In the process of the embodiment of this invention of choice, the dopant for doping the particle at or near its surface is a sulfonic acid or sulfonic acid derivative of the formula:

or

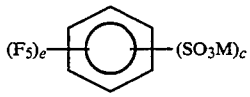

wherein;

$R_4$ is substituted alkyl wherein permissible substituents are one or more fluoro groups, carboxylic acid or a salt thereof, hydroxy groups or a combination thereof;
c is 1 or 2;
e is 1 or 2;

$R_5$ is the same or different at each occurrence and is one or more hydroxy, phenoxy substituted with one or more sulfonic acid or a salt thereof fluoro or carboxylic acid group or a salt thereof, or any two $R_5$ substituents together may form a divalent alkenylene chain completing a naphthalene ring, which ring substituted with one or more fluoro groups, phenoxy substituted with one or more sulfonic acid or a salt thereof, sulfonic acid or a salt thereof, carboxylic acid groups or a salt thereof or hydroxy; and M is a proton, or other metal or non-metal cation, with the proviso that at least one of M is proton.

The following is a listing of dopants which are useful in the practice of the most preferred embodiments of this invention for formation of the anionic dopant solute.

perfluoro octyl sulfonic acid
2,5-dihydroxy-1,4-benzene disulfonic acid,
trion (4,5-dihydroxy-1,3-benzene disulfonic acid),
4-sulfophthalic acid,
1,8-dihydroxynaphthalene-3-6-disulfonic acid,
3,6-dihydroxynaphthalene-2,7-disulfonic acid,
4,5-dihydroxynaphthalene-2,7-disulfonic acid,
6,7-dihydroxy-2-naphthalene sulfonic acid,
1-naphthalene-5,7-dinitro-8-hydroxy,
1-naphthalene-4-hydroxy sulfonic acid,
4-bromobenzene sulfonic acid,
4-chorobenzene sulfonic acid
4-hydroxy-5-isopropyl-2-methyl benzene sulfonic acid
3,4-diamino benzene sulfonic acid
3,4-dinitro benzene sulfonic acid,
2-methoxy benzene sulfonic acid,
1-naphthalene-5-hydroxy sulfonic acid,
1-naphthalene-7-hydroxy sulfonic acid,
1-naphthalene-3-hydroxy sulfonic acid,
2-napthalene-1-hydroxy sulfonic acid,
4-phenylamino benzene sulfonic acid,
1,3-naphthalene-7-hydroxy disulfonic acid
trifluoromethane sulfonic acid,
4-hydroxybenzene sulfonic acid,
1-naphthol-3,6-disulfonic acid,
diphenylether-4,4'-disulfonic acid,
diphenylsulfone-4,4'-disulfonic acid,
2,5-dihydroxy-1,4-benzene disulfonic acid
hydroxy propane sulfonic acid The amount of dopant added to the conjugated polymer is not critical and may vary widely. In general, sufficient dopant is added to the conjugated polymer such that the conductivity of at least about $10^{-8}$ $ohm^{-1}cm^{-1}$. The upper level of conductivity is not critical and will usually depend on the type of conjugated polymer employed and the dopant. In general, the highest level of conductivity that can be obtained is provided without unduly adversely affecting the environmental stability of the conjugated polymer. In the preferred embodiments of the invention, the amount of dopant employed is sufficient to provide a conductivity of at least about $10^{-6} ohm^{-1}cm^{-1}$ and in the particularly preferred embodiments is sufficient to provide a conductivity of from about $10^{-4}ohm^{-1}cm^{-1}$ to about $10^{+3}ohm^{-1}cm^{-1}$. Amongst these particularly preferred embodiments, most preferred are those embodiments in which sufficient dopant is employed to provide a conductivity of at least about $10^{-3}ohm^{-1}cm^{-1}$ to about $10^{+3}ohm^{-1}cm^{-1}$, with amounts sufficient to provide a conductivity from about $10^0 ohm^{-1}cm^{-1}$ to about $10^{+3}ohm^{-1}cm^{-1}$ usually being the amounts of choice.

The method of forming the thermally stable electrically conductive conjugated polymer is not critical and may vary widely. Suitable techniques are those described in U.S. Pat. Nos. 4,442,187 and 4,321,114. Such processes include the direct chemical polymerization of molecules of Formula I in the presence of chemical species as $[R_1(SO^-_3)_r]M^{+1}$, $[R_1(BO^=_2)_r]M^{+2}$, $R_1(BO_2H^-)M^{+1}$ and/or $[R_1(PO^=_3)_r]M^{+2}$, wherein $R_1$ contains at least one polar group. Also, such processes include electrochemical doping of neutral conjugated polymer as described in U.S. Pat. No. 4,321,114. Another process is electrochemical polymerization of aniline and its derivatives as described in Formula I in the presence of $[R_1SO_3-]_n M^{+n}$ are described in Kobayaski, Tetsuhiko, et al., *J. Electroanal. Chem.*, "Electrochemical Reactions Concerned with Electrochromism of Polyaniline Film-Coated Electrodes", 77, pp. 28-29 (1984). Yet another process of forming the conjugated polymer of this invention involves the exchange of arbitrary dopants in the conjugated polymer with a suitable dopant anion such as $R_1(SO^-_3)_r$, $R_1(OPO^-_2)_r$ and/or $R_1(OPOH^-)_r$, wherein $R_1$ contains a polar substituent. For example, in this process, polyaniline can be doped by contacting same with a solution containing an excess of a compound which ionizes in solution into cation and a suitable dopant anion such as $R_1(SO^-_3)$, $R_1(OPO^=_2)$ and $R_1(OPOH^-)$.

The conjugated polymer may be doped with a single dopant or with more than one dopant. When more than one dopant is used, the dopants of this invention are preferably structured in a core/skin arrangement with other dopants within the basic morphological unit of the conjugated polymer (fibril, globule, aggregate, and the like), or the dopants may be mixed throughout the unit. When the highest thermal stability is desired, it is generally preferred that the most thermally stable dopant anion be incorporated as the skin (surface) dopant. This skin preferably covers the smallest morphological unit accessible (the primary particle). When high dispersibility is required, the surface dopant anion is preferably an anion containing a long aliphatic moiety in which case the thermally stable anions of this invention are preferably incorporated in the core of said particles.

Another aspect of this invention relates to composition comprising one or more doped electrically conductive conjugated polymer of this invention, and one or more thermoplastic, one or more thermosetting polymers or a combination thereof. One advantage of this composition is that because of the thermal stability of the conjugated polymer, articles can be fabricated from these compositions using conventional melt or heat processing techniques. Also composites of the conjugated polymers can be used at temperatures much higher then heretofore available to conductive conjugated polymer. The proportion of conjugated polymer to thermoplastic or thermoset polymer is not critical and may vary widely, depending on the use of the composition. For example, for those uses which require the composite having higher conductivities, i.e., up to or greater than about $10^0 ohm^{-1}cm^{-1}$ the amount of electrically conductive conjugated polymer will tend to be relatively high, as for example up to and greater than about 10 weight percent, based on the total weight of the composition. Conversely, for those uses in which greater flexibility or impact resistance and lower conductivities are required, i.e., down to or less than about $10^{-6} ohm^{-1}cm^{-1}$, the amount of electrically conductive conjugated polymer will tend to be relatively low, down to or less than about 5 weight percent based on the total weight of the composition. In the preferred embodiments of the invention, the amount of electrically conductive conjugated polymer is from about 1 to about 60 weight percent based on the total weight of the composition, and in the particularly preferred embodiments of the invention the amount of conductive polyaniline is from about 5 to about 40 weight percent on the aforementioned basis. Amongst these particularly preferred embodiments most preferred are those embodiments in which the composition comprises from about 5 to about 30 weight percent of the electrically conductive conjugated polymer based on the total weight of the composition.

In general, the amount of thermoplastic resin, thermosetting resin or combination thereof is from about 25 to about 99 wt. % based on the total weight of the matrix. In the preferred embodiments of the invention, the amount of the resin(s) is from about 30 to about 99 wt. % based on the total weight of the matrix. In the particularly preferred embodiments, the amount of resin(s) in the matrix is from about 50 to about 95 wt. % based on the weight of matrix. In the most preferred embodiments of the invention, the amount of resin(s) in the matrix is from about 55 to about 70 wt. % based on the total weight of the matrix.

Thermosetting resins useful in the practice of this invention may vary widely. Illustrative of useful thermosetting resins are alkyds such as those derived from esterification of polybasic acids, as for example, phthalic anhydride, fumaric acid, maleic anhydride, isophthalic acid, terephthalic acid, trimesic acid, hemimellitic acid, succinic anyhydride, fatty acids derived from mineral or vegetable oils and the like, and polyhydric alcohols as for example glycerol, ethylene glycol, propylene glycol, pinacol, 1,4-butanediol, 1,3-propanediol, sorbitol, pentaerythritol, 1,2-cyclohexanediol and the like. Other useful thermosetting resins are acrylics such as crosslinkable polyacrylics, polyacrylates, epoxydiacrylates, urethane diacrylates and the like. Still other useful thermosetting resins are amino resins derived from reaction between formaldehyde and various amino compounds such as melamine, urea, aniline, ethylene urea, sulfonamide, dicyanodiamide and the like. Other useful thermosetting resins include urethanes derived from reaction of polyisocyanates or diisocyanates such as 2,6-tolylene diisocyanate, 2,4-tolylene diisocyanate, 4,4'-diphenyl-methane diisocyanate, 4,4'-dicyclohexylmethane diisocyanate and the like, and polyols such as glycerin, ethylene glycol, diethylene glycol, trimethylolpropane, 1,2,6-hexanetriol, sorbitol, pentaerythritol and the like.

Exemplary of still other thermosetting resins useful in the practice of this invention are unsaturated polyesters derived from reaction of dibasic acids such as maleic anhydride, fumaric acid, adipic acid, azelaic acid and the like, and dihydric alcohols such as ethylene glycol and propylene glycol, 1,3-butylene glycol, 2,3-butylene glycol, diethylene glycol, dipropylene glycols and the like; and silicones such as dimethyldichlorosilane and the like.

Yet another class of useful thermosetting resins are epoxies based on saturated or unsaturated aliphatic, cycloaliphatic, aromatic and heterocyclic epoxides. Useful epoxides include glycidyl ethers derived from epichlorohydrin adducts and polyols, particularly polyhydric phenols. Another useful epoxide is the diglycidyl ether of bisphenol A. Additional examples of useful polyepoxides are resorcinol diglycidyl ether, 3,4-epoxy-6-methylcyclohexylmethyl-9, 10-epoxystearate, 1,2,- bis(2,3-epoxy-2-methylpropoxy)ethane, diglycidyl ether of 2,2-(p-hydroxyphenyl) propane, butadiene dioxide, dicyclopentadiene dioxide, pentaerythritol tetrakis(3,4-epoxycyclohexanecarboxylate), vinylcyclohexene dioxide, divinylbenzene dioxide, 1,5-pentadiol bis(3,4-epoxycyclohexane carboxylate), ethylene glycol bis(3,4-epoxycyclo-hexane carboxylate), 2,2-diethyl-1,3-propanediol bis(3,4-epoxycyclohexanecarboxylate), 1,6-hexanediol bis(3,4-epoxycyclohexanecarboxylate), 2-butene-1,4-diol bis(3,4-epoxy-6-methylcyclohexanecarboxylate), 1,1,1-trimethylolpropane tris (3,4-epoxycyclohexanecarboxylate), 1,2,3-propanetriol tris(3,4-epoxycyclohexanecarboxylate), dipropylene glycol bis(2-ethylexyl-4,5-epoxycyclohexane-1,2-dicarboxylate), diethylene glycol bis(3,4-epoxy-6-methylcyclohexanecarboxylate), triethylene glycol bis(3,4-epoxycyclohexanecarboxylate), 3,4-epoxycyclohexylmethyl 3,4-epoxycyclohexanecarboxylate, 3,4-epoxy-1-methylcyclohexylmethyl 3,4-epoxy-1-methylcyclohexanecarboxylate, bis(3,4-epoxycyclohexylmethyl) pimelate, bis(3,4-epoxy-6-methylenecyclohexylmethyl) maleate, bis(3,4-epoxy-6-methylcyclohexylmethyl) succinate, bis(3,4-epoxycyclohexylmethyl) oxalate, bis(3,4-epoxy-6-methylcyclohexylmethyl) sebacate, bis(3,4-epoxy-6-methylcyclohexylmethyl) adipate, bis(3,4-epoxycyclo-hexylmethyl) terephtalate, 2,2'-sulfonyldiethanol bis(3,4-epoxycyclohexanecarboxylate), N,N'-ethylene bis(4,5-epoxycyclohexane-1,2-dicarboximide), di(3,4-epoxycyclohexylmethyl) 1,3-tolylenedicarbamate, 3,4-epoxy-6-methylcyclohexanecarboxaldehyde acetal, 3,9-bis(3,4-epoxycyclohexyl) spirobi-(methadioxane), and the like.

Useful thermosetting resins also include phenolic resins produced by the reaction of phenols and aldehydes. Useful phenols include phenol, o-cresol, m-cresol, p-cresol, p-tertbutylphenol, p-tertoctylphenol, p-nonylphenol, 2,3-xylenol, 2,4-xylenol, 2,5-xylenol, 2,6-xylenol, 3,1-xylenol, 3,4-xylenol, resorcinol, bisphenol-A and the like. Useful aldehydes include formaldehyde, acetoldehyde, propionaldehyde, n-butyraldehyde, isobutyraldehyde, glyoxal, furfural and the like.

Other useful thermosetting resins are aromatic vinylesters such as the condensation product of epoxide resins and unsaturated acids usually diluted in a compound having double bond unsaturation such as vinylaromatic monomer as for example styrene and vinyltoluene, and diallyl phthalate. Illustrative of useful vinylesters are diglycidyl adipate, diglycidyl isophthalate, di(2,3-epoxybutyl) adipate, di(2,3-epoxybutyl) oxalate, di(2,3-epoxyhexyl) succinate, d(3,4-epoxybutyl) maleate, d(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulphonyldibutyrate, tri(2,3-epoxybutyl) 1,2,4 butanetricarboxylate, di(5,6-epoxypentadecyl) maleate, di(2,3-epoxybutyl) azelate, di(3,4-epoxybutyl) citrate, di(5,6-epoxyoctyl) cyclohexane-1,3-dicarboxylate, di(4,5-epoxyoctadecyl) malonate, bisphenol-A-fumaric acid polyester and the like.

Preferred thermosetting resins for use in the practice of this invention are vinyl esters, unsaturated polyesters, epoxies and phenolics. Particularly preferred thermosetting resins are vinyl esters, epoxies and phenolics, with vinylesters being the thermosetting resin of choice.

Thermoplastic resins for use in the practice of this invention may also vary widely. Illustrative of useful thermoplastic resins are polylactones such as poly(pivalolactone), poly(e-caprolactone) and the like; polyurethanes derived from reaction of diisocyanates such as 1,5-naphalene diisocyanate, p-phenylene diisocyanate, m-phenylene diisocyanate, 2,4-toluene diisocyanate, 4,4' diphenylmethane diisocyanate, 3-3'-dimethyl-4,4'diphenylmethane diisocyanate, 3,3'-dimethyl-4,4'biphenyl diisocyanate, 4,4' diphenylisopropylidiene diisocyanate, 3,3'-dimethyl-4,4'diphenyl diisocyanate, 3,3'-dimethyl-4,4'-diphenylmethane diisocyanate, 3,3'-dimethoxy-4,4'-biphenyl diisocyanate, dianisidine diisocyanate, tolidine diisocyanate, hexamethylene diisocyanate, 4,4'-diisocyananodiphenylmethane and the like and linear long-chain diols such as poly(tetramethylene adipate), poly(ethylene adipate), poly(1,4-butylene adipate), poly(1,5-pentylene adipate), poly(1,3 butylene adipate), poly(ethylene succinate), poly(2,3-butylene succinate), polyether diols and the like; polycarbonates such as poly[methane bis (4-phenyl) carbonate], poly[1,1-ether bis(4-phenyl) carbonate], poly[diphenylmethane bis (4-phenyl)carbonate], poly[1,1-cyclohexane bis(4-phenyl)carbonate] and the like; poly sulfones; polyether ether ketones; polyamides such as poly(4-amino butyric acid), poly(hexamethylene adipamide), poly(6-aminohexanoic acid), poly(m-xylylene adipamide), poly(p-xylylene sebacamide), poly(2,2,2-trimethyl hexamethylene terephthalamide), poly(metaphenyleneisophthalamide) (Nomex), poly(p-phenylene terephthalamide) (Kevlar), and the like; polyesters such as poly(ethylene azelate), poly(ethylene-1,5-naphthalate), poly(1,4-cyclohexane dimethylene terephthalate), poly(ethylene oxybenzoate) (A-Tell), poly(parahydroxy benzoate) (Ekonol), poly(1,4-cyclohexylidene dimethylene terephthalate) (Kodel)(as), Poly(1,4-cyclohexylidene dimethylene terephthalate) (Kodel) (trans), polyethylene terephthalate, polybutylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide) and the like; polyetherimides; thermoplastic elastomers such as polyurethane elastomers, fluoroelastomers, butadiene/acrylonitrile elastomers, silicone elastomers, polybutadiene, polyisobutylene, ethylene-propylene copolymers, ethylene-propylene-diene terpolymers, polychloroprene, polysulfide elastomers, block copolymers, made up of segments of glassy or crystalline blocks such as polystyrene, poly(vinyltoluene), poly(t-butyl styrene), polyester and the like and the elastomeric blocks such as polybutadiene, polyisoprene, ethylene-propylene copolymers, ethylene-butylene copolymers, polyether ester and the like as for example the copolymers in polystyrene-polybutadiene-polystyrene block copolymer manufactured by Shell Chemical Company under the trade name of Kraton; vinyl polymers and their copolymers such as polyvinyl acetate, polyvinyl alcohol, polyvinyl chloride, polyvinyl butyral, polyvinyl-idene chloride, ethylene-vinyl acetate copolymers, and the like; polyacrylics, polyacrylate and their copolymers such as polyethyl acrylate, poly(n-butyl acrylate), polymethyl methacrylate, polyethyl methacrylate, poly(n-butyl methacrylate), poly(n-propyl methacrylate), polyacrylamide, polyacrylonitrile, polyacrylic acid, ethyleneacrylic acid cepolymers, methyl methacrylate-styrene copolymers, ethylene-ethyl acrylate copolymers, methacrylated budadiene-styrene copolymers and the like; polyolefins such as low density polyethylene, polypropylene, chlorinated low density polyethylene, poly(4-methyl-1-pentene) and the like; ionomers; and polyepichlorohydrins.

In the preferred embodiments of the invention, the thermoplastic material is selected from the group consisting of polyurethanes, polyvinyls, polystyrene-polyisoprene-polystyrene block copolymer thermoplastic elastomers, polyacrylics and polyolefins. In the particularly preferred embodiments of the invention the preferred thermoplastic material is a polyurethane. The composition of this invention may include various optional components such as plasticizers, blending aids, colorants, flame-retardants and the like, or components which either fill or form a substrate for the composition to be cast from the melt or solution. These other components may vary widely and may include any material known for use in conventional polymer compositions. Illustrative of such other components are such material as carbon, metal conductors, reinforcing fibers, inert fillers, glass beads, clays, other conductive and non-conductive polymers, conductive ceramics, super-conductive ceramics, and the like.

The composition of this invention can be prepared using conventional techniques as for example conventional melt or solution blending techniques. For example, such compositions can be formed by heating and mixing a mixture of the various components to a temperature which is equal to or greater than the melting point or flow point of at least one of the polymer components to form a molten intimate mixture to which optional components may be added as desired. Thereafter the mixture can be formed into a desired article through use of any conventional shape forming technique. For example, the molten mixture can be formed into a desired article through use of any conventional shape forming technique. For example, the molten mixture can be spread on a surface and allowed to cool forming free standing films or films coating other substitutes. The molten mixture can be extruded through a die to form films or fibers, or injection molded into a suitable mold to form molded parts having the shape of the mold. The manner in which the molten mixture is formed is not critical and conventional methods can be employed. For example, the molten mixture can be formed through use of conventional polymer and additive blending means, in which the polymeric components are heated to a temperature equal to or greater than the melting point of at least one of the polymers, and below the degradation temperature of each of the polymers. Ultrasonification can be used to improve dispersion of the non-soluble phases. The desired amount of the optional ingredients in a liquid or powdered from is added to the melted polymers while at the same time vigorously agitating the melt as for example by stirring or irradiating with ultrasound, or added prior to melting and mixing.

In a solution process for the preparation of the composition of this invention a solution of the desired host polymer in a suitable solvent with a or without a dopant solute is formed. The desired optional components in the desired amounts may be dissolved or dispersed in the solution. The dissolved and/or dispersed polymers can be solidified into a desired shape by removal of the solvent through use of conventional techniques. For example, by removal of the solvent from a solution spread on a surface films can be formed of any desired thickness. By extruding the solution through a die, fibers and films can be made. Similarly, by removing the solvent from the solution in a mold, shaped articles conforming in shape to the mold can be prepared. If the original solution did not include a suitable dopant, the shaped article can be exposed to a suitable dopant to dope the polyaniline. In the preferred embodiments of the invention, however, doped polyaniline is used to form the solution.

In the most preferred embodiment, the components of the intimate mixture can be granulated, and granulated components mixed dry in a suitable mixer, as for example using ultrasonification or a tumbler or a Branbury Mixer, or the like, as uniformly as possible. Thereafter, the composition is heated and further mixed in an extruder when at least one of the polymers components is melted. As described above, the fluid mixture is thereafter ejected with cooling.

The order of mixing of the various components of the intimate mixture may not be critical. Accordingly, the order of addition of the polymers and other optional components to be desired in more detail hereinbelow, to form the initiate mixture can be varied as desired.

The electrically conductive conjugated polymer composition of this invention can be used for any purpose for which conductive polymers are useful. For example, the composition can be used to form electrically conductive articles for shielding purposes, antistatic purposes or adhesive. Examples of articles include conductive polymer housings for EMI Shielding of sensitive electronic equipment such as microprocessors, infrared, radio frequency and microwave absorbing shields, flexible electrically conducting connectors, conductive bearings, brushes and semiconducting photoconductor junctions, electrodes, capacitors, optically transparent or non-transparent corrosion-preventing coatings for corrodible materials such as steel, antistatic materials and optically transparent or non-transparent coatings for packaging electronic components, antistatic carpet fibers, waxes for floors in computer rooms, antistatic finishes for CRT screens, aircraft, auto windows, electostatic dissipative packaging for electronics, and the like.

The particles of this invention are particularly suited for use in the manufacture of emulsions, suspensions of the polyaniline, blends of the polyaniline with other polymers as for example, other conjugated backbone polymers, thermoplastic polymers such as polyamides, polycarbonates, polyesters, polylactones, polyolefins, polyacrylics; thermosetting resins such as phenolics and phenolic derivatives, alkyds, unsaturated polyester, epoxies, melamines, amino resins and allylics; and mixtures thereof.

The following specific examples are presented to more particularly illustrate the invention, and should not be construed as being limitations on the scope and spirit of the invention.

EXAMPLE I

Polyaniline tosylate (PAni OTs) was prepared from aniline, p-toluene sulfonic acid (PTSA), and ammonium persulfate solution by first combining the aniline and the acid, and then slowly adding the ammonium persulfate solution to the acid and aniline solution in approximately one hour. The solids which were formed were then filtered and washed successively three times with water, once with 10% solution of PTSA, and finally with a 2% solution of PTSA in methanol. After filtering the solids were dried in a vacuum oven at 130° C. until the temperature of the powdered solids reached 100° C.

The water content of the solids was determined to be less thant 3% by weight.

EXAMPLE 2

Polyaniline tosylate was prepared as in Example 1 with the exception that the solids were filtered and washed successively three times with hot water (70° C.) and the final washes containing PTSA were eliminated. The filter cake was not dried but kept saturated with water. Elemental analysis determined that the molar ratio of sulfur to nitrogen was 0.30, compared with a theoretical maximum of 0.50. This partially undoped polyaniline tosylate was retained for further redoping studies.

EXAMPLE 3

Polyaniline tosylate particles were redoped preferentially on their surface with dopants other than tosic acid to produce a skin/core dopant profile within each particle, particle aggregate, and/or primary particle. The filter cake of Example 2 was reslurried in a solution of an acid other than tosic acid with the aid of a high speed homogenizer. In successive experiments acid solutions having a pH of approximate 1 were prepared from benezene sulfonic acid (BZSA), 4-hydroxybenezene sulfonic acid (HBSA), biphenyl p-sulfonic acid (BPSA), 1,5 naphthalene disulfonic acid (N15SA), 2,6 naphthalene disulfonic acid (N26SA), 1-naphthol 3,6-disuifonic acid (H1N36SA), 2,5 dihydroxybenzene 1,4-disulfonic acid (H25B14SA), 3,6 dihydroxy naphthalene 2,7-disulfonic acid (H36N27SA), 6-amino-4-hydroxynapthalene sulfonic acid (6A4HNSA), 3-hydroxy-1-propane sulfonic acid (HPSA), and a random polymeric sulfonate (HPSSA) with average molecular weight of approximately 900 with the following structure:

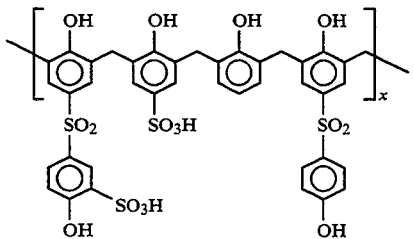

The suspension of the polyaniline tosylate was stirred in successive preparations in one of the above acids for one hour at 50° C. The suspension was then allowed to cool while stirring for a minimum of an additional 3 hours. This procedure was found to nearly completely exchange the tosic acid originally present for the new acid. The solids were filtered and a methanol solution of the given acid was then added and the mixture was stirred for an additional 0.5 h. Elemental analysis for the sulfur to nitrogen ratio of the polyaniline produced is summarized in Table 1 below. Typical water content of the samples was found to be 1 to 5 percent by weight.

TABLE 1

| POLYANILINE | S/N MOLAR RATIO |
|---|---|
| PAni OTs | 0.48 |
| PAni BZS | 0.495 |
| PAni BPS | 0.461 |
| PAni N15S | 0.419 |
| PAni N26S | 0.453 |
| PAni HBS | 0.527 |
| PAni H1N36S | 0.410 |

TABLE 1-continued

| POLYANILINE | S/N MOLAR RATIO |
|---|---|
| PAni H25B14S | 0.401 |
| PAni H36N27S | 0.436 |
| PAni 6A4HNS | 0.324 |
| PAni HPS | 0.455 |
| PAni HPSSA | 0.396 |

*from Example 1

EXAMPLE 4

Circular pellets of approximately 0.1-cm thickness and 0.7-cm diameter were compression molded at ca. 70 C from the polyaniline of Example 3. The pellets were placed in an apparatus in which the given pellet was contacted by gold pins at four equally spaced points (90 degrees apart) near the circumference of the pellet. In this configuration, a four-probe resistance measurement could be made which could be used to calculate the bulk conductivity of the pellet from the equation $\sigma = 0.215/(Rd)$, where $\sigma$ is conductivity in S/cm, R is resistance in ohms, and d is pellet thickness in cm.

The conductivity was first measured at room temperature. Since even trace amounts of water are known to enhance conductivity, the pellet was then thoroughly dried by holding the pellet in an atmosphere of flowing nitrogen at a temperature 150° C. for 16 hours. The conductivity was again measured at 150° C. after this drying procedure. The results are given in Table II below. In one case the thermal stability of the polyaniline -dopant complex was not sufficient for the samples to withstand drying at 150° C. without significant loss of conductivity. This problem was noted for PAni HPS, in which the hydroxy group was bonded to an aliphatic substrate. This behavior was reversed for each of the compositions which contained a substituent hydroxy group bonded to an aryl substrate. This observation suggested that the hydroxy group can play a similar role to that of water in enhancing the conductivity, but in contrast to water, the enhancement provided by the hydroxy group is not lost by exposure to high temperature. Further evidence for an enhancement of conductivity can be found by comparing compositions having similar structures. For instance, PAni HBS, which has a hydroxy group in the para position compared with unsubstituted PAni BZS or PAni OTs with a methyl group in the para position, evidences a greater than two fold higher conductivity after drying. Similarly, PAni H36N27S had nearly a two fold greater conductivity than its analog which lacks hydroxy substituents, PAni N26S.

TABLE 2

| POLYANILINE | RT$^c$ CONDUCTIVITY WITH 1-5% $H_2O$ (S/cm) | 150°-C. CONDUCTIVITY (DRY) (S/cm) |
|---|---|---|
| PAni OTS | 6.2 | 5.4 |
| PAni HCl | 2.9 | 2.9$^a$ |
| PAni MS | 20 | 14 |
| PAni FMS | 9.9 | 3.0 |
| PAni BZS | 5.9 | 5.3 |
| *PAni HBS | 7.1 | 12.8 |
| *PAni H25B14S | 3.7 | 5.2 |
| PAni N26S | 5.9 | 2.5 |
| *PAni H1N36S | 2.4 | 2.6 |
| *PAni H36N27S | 4.3 | 4.5 |
| *PAni PHSS | 0.57 | 1.25 |
| PAni BPS | 0.43 | 1.3 |

TABLE 2-continued

| POLY-ANILINE | RT[c] CONDUCTIVITY WITH 1-5% H$_2$O (S/cm) | 150°-C. CONDUCTIVITY (DRY) (S/cm) |
|---|---|---|
| *PAni HPS | 9.3 | 0.2[b] |
| *PAni 6A4HNS | 0.58 | 1.3 | a) Measured at 60° C. after drying at 90° C.
b) Composition was thermally unstable at 150° C.
c) Room temperature
*Compositions containing one or more hydroxy substituents

EXAMPLE 5

Polyaniline tosylate prepared as in Example 2 was redoped as in Example 3 with different acids as follows: 4-hydroxybenzenesulfonic acid (4HBS), 4-sulfophthalic acid (4SPHTH), 5-sulfosalicylic acid (5SSAL), 4-chlorobenzene sulfonic acid (4CLBS), 3,6-dihydroxynaphthalene 2,7-disulfonic acid (H36N27S), and 2,5-dihydroxybenzene 1,4-disulfonic acid (H25B14S). These polyanilines along with a polyaniline tosylate prepared as in Example 1 were tested with respect to the sensitivity of their conductivity to water content. Powdered samples of the polymers were allowed to reach equilibrium with the water vapor of laboratory air for a period of 2 to 3 hours. These "wet" samples were compressed into pellets and their conductivity, $\sigma_{wet}(RT)$, was measured. The pellets were then mounted in an atmosphere of flowing nitrogen at 150° C. and their conductivity was again measured, $\sigma_{wet}(150°)$. After subjecting the pellets to a thorough drying at this temperature for 16 hrs, the conductivity was again measured, $\sigma_{dry}(150°$ C.). Finally the dried samples were cooled to room temperature and their conductivity was measured, $\sigma_{dry}(RT)$. The relative stability of the conductitity to water content was assessed by comparing the ratio of dry versus wet conductitiy for the different samples. These results are summarized in Table 3 below. In every case the polyanilines doped with a dopant having an anion containing at least one polar substituent exhibited a more stable and generally higher conductivity as a function of water content. These samples containing a polar substituent included those polyanilines doped with 4SPHTH (2 carboxylic acid substituents), 5SSAL (1 carboxylic acid and 1 hydroxy substituent), 4HBS (1 hydroxy substituent), 4CLBS (1 chloro substituent), H36N27s (2 hydroxy substituents), and H25B14 (2 hydroxy substituents).

TABLE 3

Wet and Dry Conductivities of Polyaniline Compositions

| Composition | $\sigma_{wet}$ (RT) (S/cm) | $\sigma_{wet}$ (150° C.) (S/cm) | $\sigma_{dry}$ (150° C.) (S/cm) | $\sigma_{dry}$ (RT) (S/cm) | Ratio* |
|---|---|---|---|---|---|
| PAni OTs | 13.9 | 15.1 | 7.22 | 5.05 | 0.36 |
| PAni B13DS | 5.4 | 11.1 | 5.21 | — | 0.47 |
| PAni 4SPHTH | 6.12 | 9.44 | 2.62 | — | 0.28 |
| PAni 5SSAL | 10.2 | 16.5 | 9.24 | 6.35 | 0.62 |
| PAni 4HBS | 12.7 | 20.3 | 12.9 | 9.98 | 0.79 |
| PAni 4CLBS | 10.1 | 15.0 | 8.28 | 5.81 | 0.58 |
| PAni H36N27S | 5.36 | 12.0 | 5.82 | 3.17 | 0.59 |
| PAni | 11.1 | 19.71 | 10.2 | 6.52 | 0.59 |

TABLE 3-continued

Wet and Dry Conductivities of Polyaniline Compositions

| Composition | $\sigma_{wet}$ (RT) (S/cm) | $\sigma_{wet}$ (150° C.) (S/cm) | $\sigma_{dry}$ (150° C.) (S/cm) | $\sigma_{dry}$ (RT) (S/cm) | Ratio* |
|---|---|---|---|---|---|
| H25B14S | | | | | |

1. *$\sigma$ dry/$\sigma$ wet at room temperature.
2. † $\sigma$ dry/$\sigma$ wet at 150° C.
3. †† Unusually large loss in conductivity likely due to a reaction to the dopant with the PAni backbone.
4. "B13DS" means benzene 1,3-disulfonate.
5. "4HBS" means 4-hydroxybenzenesulfonate.
6. "4SPHTH" means 4-sulfophthalate.
7. "5SSAL" means 5-sulfosalicylate.
8. "4CLBS" means 4-chlorobenzene sulfonate.
9. "H36N27S" means 3,6-dihydroxynaphthalene 2,7-disulfonate.
10. "H25B14S" means 2,5-dihydroxybenzene 1,4-disulfonate.

What is claimed is:

1. An electrically conductive substituted or unsubstituted conjugated homopolymer or copolymer complex comprising a substituted or unsubstituted positively charged conjugated homopolymer or copolymer cation doped with a negatively charge dopant anion, said dopant anion having at least one anionic functionality and having at least one functionality selected from the group consisting of non-ionic polar groups having an electronegativity or electropositivity such that said group or groups have a net polar group molar contribution greater than zero.

2. A complex according to claim 1 wherein said conjugated homopolymer or copolymer is a conjugated backbone homopolymer or copolymer.

3. A complex according to claim 2 wherein said conjugated backbone homopolymer or copolymer is a substituted or unsubstituted polyaniline.

4. A complex according to claim 3 wherein said polyaniline is of the type derived from polymerizing an aniline of the Formula I:

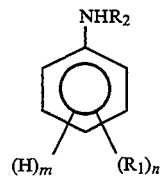

FORMULA I or is a derivative of a polyaniline of the type derived from polymerizing said aniline, wherein:
n is an integer from 1 to 5;
m is an integer from 0 to 5, with the proviso that the sum of n and m is 5 and with the further proviso that at least one position on the aniline ring is substituted with a substituent which will allow coupling of aniline groups to form the polyaniline;
$R_1$ is phosphinic acid or a salt or ester thereof, phosphonic acid or a salt or ester thereof, sulfonic acid or a salt or ester thereof, boric acid or a salt or ester thereof, phosphoric acid or a salt or ester thereof, amino, hydroxy, sulfinic acid or a salt or ester thereof, nitro, carboxylic acid or a salt or ester thereof, halo, cyano, deuterium, or substituted or unsubstituted alkyl, alkenyl, alkoxy, cycloalkyl, cycloalkenyl, alkanoyl, alkylthio, alkynyl, dialkylamino, arylamino, diarylamino, alkylarylamino, aryloxy, hydroxy, alkylthioalkyl, alkylaryl, arylalkyl, amino, alkylsulfinyl, alkoxyalkyl, alkylsulfonyl, aryl, arylthio, arylsulfinyl, alkoxycarbonyl, alkylsilane, or arylsulfonyl, wherein permissible substituents are one or more amino, alkylamino, dialkylamino, arylamino, diarylamino, phosphinic acid salt or ester thereof, alkylarylamino, phosphonic acid salt or ester thereof, sulfonic acid salt or ester thereof, boric acid salt or ester thereof, sulfinic acid salt or ester thereof, phosphoric acid salt or ester thereof, carboxylic acid salt or ester thereof, halo, nitro, hydroxy, cyano or epoxy moieties; or any two $R_1$ substituents or any one $R_1$ substituent and $R_2$ substituent taken together may form substituted or unsubstituted alkylene, alkynylene or alkenylene chain or a substituted or unsubstituted alkylene, alkynylene or alkenylene chain including one or more divalent ester, carbonyl, nitrogen, sulfur, sulfinyl, sulfonyl or oxygen completing a 3, 4, 5, 6, 7, 8, 9 or 10 membered aromatic, heteroalicyclic, heteroaromatic or alicyclic carbon ring, wherein permissible substituents are one or more amino, alkylamino, phosphinic acid salt or ester thereof, dialkylamino, arylamino, diarylamino, alkylaryiamino, phosphonic acid or a salt or ester thereof, sulfonic acid or a salt or ester thereof, boric acid or a salt or ester thereof, sulfinic acid or a salt or ester thereof, phosphoric acid or a salt or ester thereof, carboxylic acid or a salt or ester thereof, halo, nitro, hydroxy, cyano or epoxy moieties, or $R_1$ is an aliphatic moiety having repeat units of the formula:

$(OCH_2CH_2)_qO\text{—}CH_3$, $(OCH_2CH(CH_3))_qO\text{—}CH_3$, $(CH_2)_qCF_3$, $(CF_2)_qCF_3$ or $(CH_2)_q CH_3$ wherein q is a positive whole number; and
$R_2$ is the same or different at each occurrence and is $R_1$ substituents or hydrogen.

5. A complex according to claim 4 wherein n is 0 to 4 and m is 1 to 5.

6. A complex according to claim 5 wherein the polyaniline comprises repeat units of the Formula II, Formula III or a combination thereof;

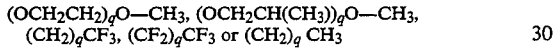

Formula II

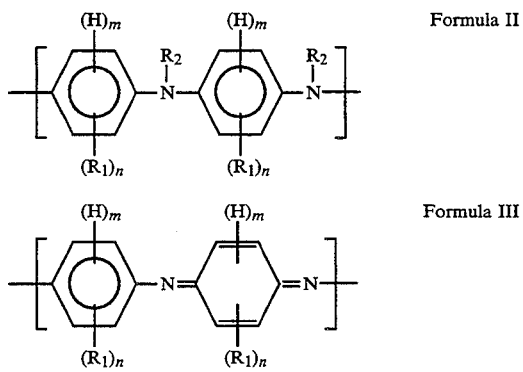

Formula III wherein:
n and m are the same or different at each occurrence and are integers from 0 to 4, with the proviso that the sum of n and m is 4;
$R_1$ is phosphinic acid or a salt or ester thereof, phosphonic acid or a salt or ester thereof, sulfinic acid or a salt or ester thereof, boric acid or a salt or ester thereof, phosphoric acid or a salt or ester thereof, alkylamino, dialkylamino, arylamino, diarylamino, alkylarylamino, amino, hydroxy, sulfonic acid or a salt or ester thereof, nitro, carboxylic acid or a salt or ester thereof, halo, cyano, deuterium, or substituted or unsubstituted alkyl, alkenyl, alkoxy, cycloalkyl, cyclalkenyl, alkanoyl, alkylthio, alkynyl, dialkylamino, arylamino, diarylamino, alkylarylamino, aryloxy, hydroxy, alkylthioalkyl, alkylaryl, arylalkyl, amino, alkylsufinyl, alkoxylalkyl, alkylsulfonyl, aryl, arylthio, arylsulfinyl, alkoxycarbonyl, alkylsilane, or arylsulfonyl, wherein permissible substituents are one or more amino, alkylamino, dialkylamino, arylamino, diarylamino, phosphinic acid or a salt or ester thereof, alkylarylamino, phosphonic acid or a salt or ester thereof, sulfonic acid or a salt or ester thereof, boric acid or a salt or ester thereof, sulfinic acid or a salt or ester thereof, phosphoric acid or a salt or ester thereof, carboxylic acid or a salt or ester thereof, halo, nitro, hydroxy, cyano or epoxy moieties; or any two $R_1$ substituents or any one $R_1$ substituent and $R_2$ substituent taken together may form substituted or unsubstituted alkylene, alkynylene or alkenylene chain or substituted or unsubstituted alkylene, alkynylene or alkenylene chain including one or more divalent ester, carbonyl, nitrogen, sulfur, sulfinyl, sulfonyl or oxygen completing a 3, 4, 5, 6, 7, 8, 9 or 10 membered aromatic, heteroalicyclic, heteroaromatic or alicyclic carbon ring, wherein permissible substituents are one or more amino, alkylamino, phosphinic acid or a salt or ester thereof, dialkylamino, arylamino, diarylamino, alkylarylamino, phosphonic acid or a salt or ester thereof, sulfonic acid or a salt or ester thereof, boric acid or a salt or ester thereof, sulfinic acid or a salt or ester thereof, phosphoric acid or a salt or ester thereof, carboxylic acid or a salt or ester thereof, halo, nitro, hydroxy, cyano or epoxy moieties, or $R_1$ is an aliphatic moiety having repeat units of the formula:

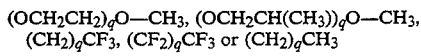

wherein q is a positive whole number; and
$R_2$ is the same or different at each occurrence and is $R_1$ substituents or hydrogen.

7. A complex according to claim 6 wherein said homopolymer or copolymer is comprised of the Formula IV:

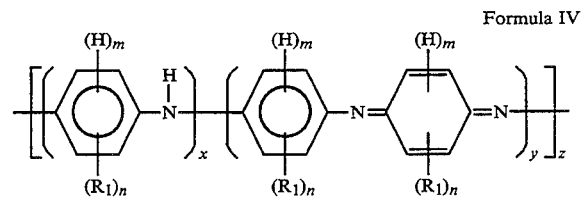

Formula IV wherein:
x and y are the same or different at each occurrence and are integers equal to or greater than 0, with the proviso that the sum of x and y are greater than 0;
z is an integer equal to or greater than about 1;
n is an integer from 0 to 4;
m is an integer from 0 to 4, with the proviso that the sum of n and m is 4;
$R_1$ is the same or different at each occurrence and is alkyl, alkenyl, alkoxy, cycloalkyl, cycloalkenyl, alkanoyl, amino, alkylamino, dialkylamino, arylamino, diarylamino, alkylarylamino, alkylthio, aryloxy, alkylthioalkyl, alkylaryl, arylalkyl, alkylsulfinyl, alkoxyalkyl, alkylsulfonyl, aryl, arylthio, arylsulfinyl, alkoxycarbonyl, sulfinic acid or a salt or ester thereof, phosphinic acid or a salt or ester thereof, phosphonic acid or a salt or ester thereof, alkylsilane, boric acid or a salt or ester thereof, arylsulfonyl, carboxylic acid or a salt or ester thereof, halo, hydroxy, nitro, cyano, sulfonic acid or a salt or ester thereof, phosphoric acid or a salt or ester thereof or aryl, alkyl or alkoxy substituted with one or more sulfinic acid or a salt or ester thereof, carboxylic acid or a salt or ester thereof, phosphoric acid or a salt or ester thereof, boric acid or a salt or ester thereof, sulfonic acid or a salt or ester thereof, halo, nitro, cyano, epoxy, hydroxy, phosphinic acid or a salt or ester thereof, or phosphonic acid or a salt or ester thereof; or any two $R_1$ groups or any one $R_1$ group and $R_2$ group together may form a substituted or unsubstituted alkylene or alkenylene chain or a substituted or unsubstituted alkylene or alkenylene chain including one or more divalent nitrogen, ester, carbonyl, sulfur, sulfinyl, sulfonyl or oxygen group completing a 3, 4, 5, 6, 7, 8, 9 or 10 membered heteroaromatic, heteroalicyclic, aromatic or alicyclic carbon ring, wherein permissible substituents are one or more sulfonic acid or salt or ester thereof, carboxylic acid or salt or ester thereof, phosphoric acid or salt or ester thereof, boric acid or salt or ester thereof, sulfinic acid or salt or ester thereof, halo, nitro, cyano, epoxy, hydroxy, phosphinic acid or salt or ester thereof or, phosphonic acid or salt or ester thereof.

8. A complex according to claim 7 wherein $R_2$ is hydrogen.

9. A complex according to claim 8 wherein m is 3 or 4 and n is 0 or 1.

10. A complex according to claim 9 wherein $R_1$ is the same or different at each occurrence and is alkyl or alkoxy having from 1 to about 12 carbon atoms, sulfonic acid or salt or ester thereof, carboxylic acid or salt or ester thereof, phosphoric acid or salt or ester thereof, boric acid or salt or ester thereof, sulfinic acid or salt or ester thereof, phosphinic acid or salt or thereof or phosphonic acid or salt or ester thereof.

11. A complex according to claim 10 wherein $R_1$ is the same or different at each occurrence and is alkyl or alkoxy having from 1 to about 6 carbon atoms or sulfonic acid or salt thereof.

12. A complex according to claim 11 wherein:
x is an integer equal to or greater than 1;
y is equal to or greater than 0; and
z is an integer equal to or greater than about 5.

13. A complex according to claim 12 wherein:
x and y are integer equal to or greater than 1 with the proviso that the ratio of x to y is equal to or greater than 1; and
z is an integer equal to or greater than 5.

14. A complex according to claim 13 wherein:
m is 4 and n is 0;
x and y are integers equal to or greater than 1, with the proviso that the ratio of x to y is equal to about 2; and
z is an integer equal to or greater than about 10.

15. A complex according to claim 1 wherein said dopant anion is substituted by a polar group or polar groups having a net polar group molar contribution greater than about 200 J $^{\frac{1}{2}}$ cm$^2$mol$^{-1}$.

16. A complex according to claim 15 wherein said net polar group molar contribution is greater than 400 J $^{\frac{1}{2}}$ cm$^2$mol$^{-1}$.

17. A complex according to claim 16 wherein said net polar group molar contribution is greater than 500 J $^{\frac{1}{2}}$ cm$^2$mol$^{-1}$.

18. A complex according to claim 16 wherein said net polar group molar contribution is from about 500 to about 1000 J $^{\frac{1}{2}}$ cm$^2$mol$^{-1}$.

19. A complex according to claim 16 wherein said dopant anions are organic species of the formulas:

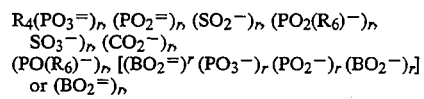

wherein: $R_4$ is an organic radical with the proviso that $R_4$ is substituted with one or more polar groups; $R_6$ is an organic radical or hydrogen; and r is 0 or an integer of from 1 to 8, with the proviso that at least one r is not 0.

20. A complex according to claim 19 wherein said dopant anions are derived from organic acid dopants having anionic moieties of the formulas:

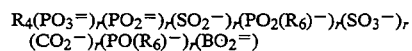

having a cationic moiety or moieties of the Formula:

wherein at least one of the cationic moieties of the formula $M^{+s}$ is a proton or is a moiety which can be transformed into a proton under use conditions;
$M^{+s}$ is a cationic species having a positive charge s;
s is an integer equal to or greater than 1, preferably from 1 to about 8;
$R_4$ and $R_6$ are the same or different and are organic radicals, with the proviso that $R_4$ is substituted with at least one polar group; and
r is the same or different and is an integer equal to or greater than 0 with the proviso that at least one r is greater than 0; preferably from 0 to about 8.

21. A complex according to claim 20 wherein dopants are acids or acid derivatives of the formula:

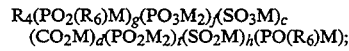

or

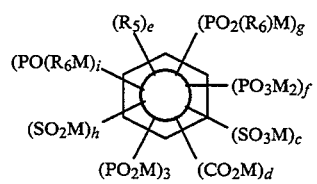

wherein:
M is H$^+$, or other metal or non-metal cation with the proviso that at least one of M is H$^+$ or a moiety which can be thermally or chemically transformed into a proton under use conditions;
t is 0, 1, 2, 3 or 4;
h is 0, 1, 2, 3 or 4;
i is 0, 1, 2, 3 or 4;
c is 0, 1, 2, 3 or 4;
d is 0, 1, 2, 3 or 4;

f is 0, 1, 2, 3 or 4;

g is 0, 1, 2, 3 or 4, with the proviso that at least one of c, d, f, g, h, i or t is other than 0;

e is 0, 1 or 2;

$R_4$ is a polar group selected from the group consisting of aryl, alkythio, alkoxycarbonyl, alkylcarbonyl, carbonyl, alkylcarbonylalkyl, alkylsulfinylalkyl, hydroxy, alkylsulfonylalkyl, alkylaminoalkyl, alkylamino, dialkylamino, alkylarylamino, halo, dialkylarylamino, alkylthioalkyl, amino, alkoxy, alkylaryl, aryloxy, alkylsulfinyl, alkylsulfonyl, dialkylaminoalkyl, aryloxyalkyl, aryloxyalkoxy, alkoxyaryl, alkylaryloxy or alkoxyaryloxy, or is alkyl or arylalkyl substituted with one or more of said polar groups or one or more sulfonic acid or a salt or ester thereof, sulfinic acid or a salt or ester thereof; phosphonic acid or a salt or ester thereof, phosphinic acid or a salt or ester thereof, phosphoric acid or a salt or ester thereof, carboxylic acid or a salt or ester thereof, or boric acid or a salt or ester thereof;

$R_5$ is the same or different at each occurrence and is a polar group selected from the group consisting of cyano, nitro, hydroxy, halo, amino, carbonyl or substituted or unsubstituted alkoxycarbonyl, alkylcarbonyl, alkylcarbonylalkyl, alkylsulfinylalkyl, alkylsulfonylalkyl, alkylaminoalkyl, alkylamino, dialkylamino, aryloxy, alkylarylamino, alkylaryl, alkylthioalkyl, alkoxy, alkoxyalkyl, alkylsulfinyl, alkylthio, alkylsulfonyl, dialkylaminoalkyl, aryloxyalkyl, aryloxyalkoxy, alkoxyaryl, alkylaryloxy or alkoxyaryloxy or substituted alkyl, wherein permissible substituents are one or more sulfonic acid or a salt or ester thereof, sulfinic acid or a salt or ester thereof, phosphonic acid or a salt or ester thereof, phosphinic acid or a salt or ester thereof, phosphoric acid or a salt or ester thereof, carboxylic acid or a salt or ester thereof, or boric acid or a salt or ester thereof, or any two or more $R_5$ substituents together may form an alkylene or alkenylene chain completing a ring system which may include one or more cyclic rings, which chain is substituted with one or more of said polar groups, sulfonic acid or a salt or ester thereof, sulfinic acid or a salt or ester thereof, phosphonic acid or a salt or ester thereof, phosphinic acid or a salt or ester thereof, phosphoric acid or a salt or ester thereof, carboxylic acid or a salt or ester thereof, or boric acid or a salt or ester thereof, or $R_5$ is a moiety of the formula:

—(OCH$_2$CH$_2$)$_q$OCH$_3$ or
—(OCH$_2$CH(CH$_3$))$_q$OCH$_3$ wherein:

q is a positive whole number from 6 to about 12 or alkyl substituted with said moiety; and $R_6$ is hydrogen, alkyl, aryl, alkylaryl, aryloxy, arylalkoxy, alkylsulfinyl, alkylthio, alkylsulfonyl or alkoxy.

22. A complex according to claim 21 wherein said dopants are of the formula:

$R_4(PO_2(R_6)M)_g(PO_3M_2)_f(SO_3M)_c(PO_2M_2)_t$
$(SO_2M)_h(PO(R_6)M)_i$ or

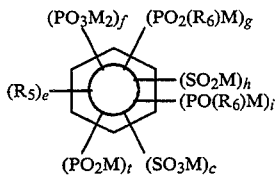

wherein:

c, t, f, g, h and i are the same or different at each occurrence and are 0, 1, 2, or 3, with the proviso that at least one of c, d, t, f or g, i or h is other than 0;

e is 1 or 2;

$R_4$ is substituted alkyl or phenylalkyl wherein permissible substituents are polar groups selected from the group consisting of carbonyl, carboxylic acid or a salt, carboxy, hydroxy, alkoxy, halo, phenyl, phenoxy, phenyl or phenoxy substituted with one or more alkyl, alkoxy, carbonyl, carboxylic acid, carboxylate salt, hydroxy, sulfonic acid, sulfonate salt, haloalkyl, perhaloalkyl, alkylthio or alkylthioalkyl;

$R_5$ is the same or different at each occurrence and is a polar group selected from the group consisting of cyano, nitro, alkoxylalkyl, alkoxy, halo, phenoxy, hydroxy, carbonyl, carboxylic acid or a salt thereof, phenyl or phenoxy substituted with one or more alkyl, alkoxy, sulfo, cyano, nitro, alkoxyalkyl, alkyl, halo, hydroxy, sulfonic acid or a salt thereof, alkylsulfinyl, alkysulfonyl, alkylsulfinylalkyl, alkylsulfonylalkyl, carboxylic acid or a salt thereof alkylthio or alkylthioalkyl substituents or any two $R_5$ substituents together may form substituted alkylene or alkenylene chain completing an aromatic or an alicyclic ring system wherein permissible substituents are the aforesaid polar groups, sulfinic acid or a salt thereof, sulfonic acid or a salt thereof, phosphonic acid or a salt thereof, or phosphinic acid or a salt therof, or $R_5$ is a moiety of the formula:

—(OCH$_2$CH$_2$)$_q$OCH$_3$ OR
—(OCH$_2$CH(CH$_3$))$_q$OCH$_3$ wherein:

q is a positive whole number from 6 to about 12:

$R_6$ is hydrogen, alkyl, alkoxy or substituted or unsubstituted phenoxy, phenyl or phenylalkyl wherein permissible substitutients are alkyl, alkoxy or a combination thereof; and M is H+, or other metal or non-metal cation, with the proviso that at least one of M is H+ or a moiety which can be thermally or chemically transformed into a proton under use or process conditions.

23. A complex according to claim 22 wherein said dopants are of the formula:

$R_4(PO_2M)_t(SO_3M)_c(PO_3)_f$ or

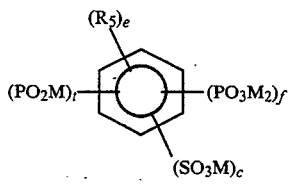

wherein:

c, f and t are the same or different and are 0, 1 or 2, with the proviso that at least one of c, f and t is not 0;

e is 1 or 2;

$R_4$ is alkyl or phenylalkyl substituted with one or more phenoxy, halo, alkoxyphenoxy, alkylphenoxy, carbonyl, hydroxy, carboxylic acid or a salt thereof, alkoxy or phenoxy substituted with one or more sulfonic acid or a salt thereof or carboxylic acid or a salt thereof;

$R_5$ is the same or different at each occurrence and is a polar group selected from the group consisting of hydroxy, halo, carbonyl, carboxylic acid or a salt thereof, or carbonyl, or substituted or unsubstituted alkoxyalkyl, alkoxyphenoxy, alkylphenoxy, alkoxy, phenylalkoxy, or phenoxy, or substituted alkyl wherein permissible substituents are one or more sulfonic acid or a salt thereof or carboxylic acid or a salt thereof; or two or more $R_5$ groups together may form a divalent alkenylene chain completing a naphthalene ring substituted with one or more of said polar groups, sulfonic acid or a salt thereof, phosphonic acid or a salt thereof, phosphinic acid or a salt thereof or sulfinic acid or a salt thereof; and M is $H^+$ or other metal or non-metal cation, with the proviso that at least one of M is $H^+$ or is a moiety which can be thermally transformed into a proton under use or process conditions.

24. A complex according to claim 23 wherein said dopants are acids or acid derivatives of the formula:

$R_4(SO_3M)_c$ or

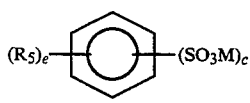

wherein:

c is 1, 2 or 3;

e is 1 or 2;

$R_4$ is alkyl substituted with one or more polar groups selected from the group consisting of phenoxy, phenoxy substituted with one or more sulfonic acid or a salt thereof or carboxylic acid or a salt thereof, hydroxy, carbonyl, or fluoro groups;

$R_5$ is the same or different at each occurrence and is a polar groups selected from the groups consisting of phenoxy, phenoxy substituted with one or more sulfonic acid or a salt thereof or carboxylic acid or a salt thereof, hydroxy, carbonyl, or two or more $R_5$ groups together may form a divalent alkenylene chain completing a naphthalene ring substituted with one or more of said polar groups, sulfonic acid or a salt thereof, sulfinic or a salt thereof, phos- phonic acid or a salt thereof, phosphinic acid or a salt thereof; and M is $H^+$ or other metal or non-metal cation or a moiety which can be thermally transformed into a proton under process conditions.

25. A complex according to claim 24 wherein said dopant is a sulfonic acid or sulfonic acid derivative of the formula:

$R_4(SO_3M)_c$ or

wherein;

$R_4$ is substituted alkyl wherein permissible substituents are one or more fluoro, carboxylic acid or a salt thereof, or hydroxy groups;

c is 1 or 2;

e is 1 or 2;

$R_5$ is the same or different at each occurrence and is a polar group selected from the group consisting of hydroxy, phenoxy, phenoxy substituted with one or more sulfonic acid or a salt thereof, halo, carbonyl, or carboxylic acid or a salt thereof, or two or more $R_5$ groups together may form a divalent alkenylene chain completing a naphthalene ring which is substituted with one or more polar groups and M is a proton, or other metal or non-metal cation, with the proviso that at least one of M is proton.

26. A complex according to claim 25 wherein $R_5$ is a polar group selected from the group consisting of hydroxy, carboxylic acid or a salt thereof or carbonyl; or two or more $R_5$ groups together may form a divalent alkenylene chain completing a naphthalene ring which is substituted with one or more polar groups selected from the group consisting of hydroxy, carboxylic acid or a salt therefor carbonyl.

27. A complex according to claim 26 wherein said dopant is selected from group consisting of 4-hydroxybenzene sulfonic acid, 1-naphthol 3,6-disulfonic acid, 2,5-dihydroxybenzene 1,4-disulfonic acid, 3,6-dihydroxy naphthalene 2,7-disulfonic acid, 6-amino-4-hydroxy naphthalene sulfonic acid, 3-hydroxybenzene sulfonic acid, 1,5-naphthalene disulfonic acid, 2,6-naphthalene disulfonic acid, diphenyl ester-4,4'-disulfonic acid, diphenyl sulfonyl-4,4'-disulfonic acid, 1,3,6-naphthalene trisulfonic acid and 2,5-dihydroxy-1,4-benzene disulfonic acid.

28. An electrically conductive particle comprising a substituted or unsubstituted positively charged conjugated polymer doped with two or more dopant anions at least one of which predominates at or near the surface of said particle and at least one of which predominates at or near the core of said particle, wherein at least one of the dopant anions predominating at or near said core is selected from the group consisting of anions substituted with one or more anionic functionalities and at least one polar group.

29. A particle according to claim 28 wherein said conjugated polymer is polyaniline and wherein said anionic functionalities are selected from the group consisting of sulfur and phosphorus containing anionic functionalities.

30. A electrically conductive composition comprising a matrix formed from one or more thermoplastic polymers, one or more thermosetting resins or a combination and the polymer complex of claim 1.

31. A electrically conductive composition comprising a matrix formed from one or more thermoplastic polymers, one or more thermosetting resins or a combination thereof having dispersed therein the particles of claim 28.

32. In an article of manufacture having an electrically conductive portion comprising a doped, electrically conductive polymer having extended conjugation in at least one backbone chain, the improvement comprising the electrically conductive polymer comprising the complex of claim 1.

33. In an article of manufacture having an electrically conductive portion comprising an electrically conductive composition comprising a doped electrically conductive polymer having extended conjugation in at least one backbone chain in a thermosetting polymer matrix, the improvement comprising the electrically conductive composition comprising the complex of claim 30.

34. In an article of manufacture having an electrically conductive portion comprising an electrically conductive composition comprising a doped electrically conductive polymer having extended conjugation in at least one backbone chain in a thermoplastic polymer matrix, the improvement comprising the electrically conductive composition comprising the complex of claim 31.

35. The complex of claim 9 wherein n is 4 and n 0.

36. The complex of claim 9 wherein the distance between at least one anionic functionality and at least one polar group is from about 5 Å to about 6 Å.

37. A complex according to claim 22 wherein said dopants are acids and/or acid derivatives of the formula:

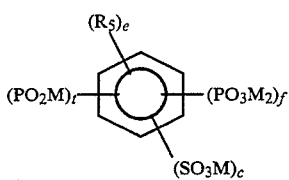

wherein:

c, f and t are the same or different and are 0, 1 or 2, with the proviso that at least one of c, f and t is not 0;

e is 1 or 2;

$R_5$ is the same or different at each occurrence and is a polar group selected from the group consisting of hydroxy, halo, carbonyl, carboxylic acid or a salt thereof, or carbonyl, or substituted or unsubstituted alkoxyalkyl, alkoxyphenoxy, alkylphenoxy, alkoxy, phenylalkoxy, or phenoxy, or substituted alkyl wherein permissible substituents are one or more sulfonic acid or a salt thereof or carboxylic acid or a salt thereof; or two or more $R_5$ groups together may form a divalent alkenylene chain completing a naphthalene ring substituted with one or more of said polar groups, sulfonic acid or a salt thereof, phosphonic acid or a salt thereof, phosphinic acid or a salt thereof or sulfinic acid or a salt thereof; and M is $H^+$ or is a moiety which can be thermally transformed into a proton under use or process conditions.

38. The complex of claim 37 wherein the distance between at least one anionic functionality and at least on polar group is from about 5 Å to about 6 Å.

39. The complex of claim 37 wherein t and f are 0.

40. The complex of claim 39 wherein $R_5$ is carbonyl, hydroxy, phenoxy, halo or phenoxy substituted with sulfonic acid or a salt thereof.

41. The complex of 40 wherein $R_5$ is hydroxy or halo.

* * * * *

UNITED STATES PATENT AND TRADEMARK OFFICE
CERTIFICATE OF CORRECTION

PATENT NO. : 5,378,403
DATED : January 3, 1995
INVENTOR(S) : Lawrence W. Shacklette It is certified that error appears in the above-identified patent and that said Letters Patent is hereby corrected as shown below:

Claim 4, Column 27, line 19, add "or a" after --phosphinic acid--.

Claim 20, Column 30, line 26, "$(BO_2^-)$" should read --$(BO_2^-)_r$--.
Claim 21, Column 30, line 48, "$(PO(R_6)M)$" should read --$(PO(R_6)M)_i$--.
Claim 22, Column 31, line 66, "$(PO(R_6)M)$" should read --$(PO(R_6)M)_i$--.

Claim 26, Column 34, line 44, "therefor carbonyl" should read --thereof or carbonyl--.
Claim 35, Column 35, line 34, "wherein n is 4 and n 0" should read --wherein m is 4 and n is 0--.

Signed and Sealed this

Twenty-sixth Day of December, 1995

Attest:

BRUCE LEHMAN

*Attesting Officer*     *Commissioner of Patents and Trademarks*